United States Patent
Blumenthal et al.

(10) Patent No.: US 11,882,929 B2
(45) Date of Patent: Jan. 30, 2024

(54) WORK STRUCTURE FOR USE WITH MODULAR STORAGE SYSTEM

(71) Applicant: Milwaukee Electric Tool Corporation, Brookfield, WI (US)

(72) Inventors: Aaron S. Blumenthal, Shorewood, WI (US); Aaron M. Williams, Milwaukee, WI (US); Ryan C. Dick, Sussex, WI (US); Tyler J. Smith, Milwaukee, WI (US); Benjamin T. Jones, St. Francis, WI (US); George Barton, Mequon, WI (US); Matthew A. Lownik, Wauwatosa, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 17/669,092

(22) Filed: Feb. 10, 2022

(65) Prior Publication Data
US 2022/0240671 A1  Aug. 4, 2022

Related U.S. Application Data

(63) Continuation of application No. PCT/US2022/014334, filed on Jan. 28, 2022.

(60) Provisional application No. 63/271,969, filed on Oct. 26, 2021, provisional application No. 63/246,124, filed on Sep. 20, 2021, provisional application No. 63/234,394, filed on Aug. 18, 2021, provisional application No. 63/176,548, filed on Apr. 19, 2021, provisional application No. 63/157,156, filed on Mar. 5, 2021, provisional application No. 63/156,075, filed on Mar. 3, 2021, provisional application No. 63/144,140, filed on Feb. 1, 2021.

(51) Int. Cl.
A47B 3/083 (2006.01)

(52) U.S. Cl.
CPC .................. *A47B 3/083* (2013.01)

(58) Field of Classification Search
CPC ................ A47B 3/083; B25H 1/12
See application file for complete search history.

(56) References Cited

U.S. PATENT DOCUMENTS

| | | |
|---|---|---|
| 3,873,114 A | 3/1975 | Brown |
| 5,224,531 A | 7/1993 | Blohm |
| 5,452,908 A | 9/1995 | Bencic |
| 5,518,258 A | 5/1996 | Cox |

(Continued)

FOREIGN PATENT DOCUMENTS

| | | |
|---|---|---|
| CN | 203344029 | 12/2013 |
| CN | 103552053 | 7/2015 |

(Continued)

OTHER PUBLICATIONS

International Search Report and Written Opinion for International Application No. PCT/US2022/014334, dated May 13, 2022, 10 pages.
Dewalt Work Bench, Folding (DWST11556), Date first available Oct. 25, 2017, [online]retrieved Feb. 9, 2022, available from https://www.amazon.com/DEWALT-Express-Folding-Workbench/dp/B076S565G9 (Year: 2017).

(Continued)

*Primary Examiner* — Matthew W Ing
(74) *Attorney, Agent, or Firm* — Reinhart Boerner Van Deuren s.c.

(57) ABSTRACT

One or more devices are provided that are configured to detachably engage within a modular system. The one or more devices are expandable to provide a surface to perform work.

19 Claims, 38 Drawing Sheets

(56) References Cited

U.S. PATENT DOCUMENTS

| | | | |
|---|---|---|---|
| 6,047,750 | A | 4/2000 | Jensen |
| 6,053,587 | A | 4/2000 | Boerder |
| 6,565,165 | B2 | 5/2003 | Switkes |
| 7,367,571 | B1 | 5/2008 | Nichols |
| 9,050,992 | B2 | 6/2015 | Smith |
| 10,583,962 | B2 | 3/2020 | Brunner et al. |
| 10,806,246 | B1 * | 10/2020 | Chen .................. A47B 3/0815 |
| 10,843,327 | B2 | 11/2020 | Etzinger |
| 10,863,819 | B1 * | 12/2020 | Chen .................. A47B 3/087 |
| 2005/0150724 | A1 | 7/2005 | Snider et al. |
| 2009/0000522 | A1 * | 1/2009 | Collins .................. A47B 3/087 108/115 |
| 2010/0089294 | A1 | 4/2010 | Medina |
| 2011/0155021 | A1 | 6/2011 | Geitner |
| 2011/0232805 | A1 | 9/2011 | Despain |
| 2017/0166352 | A1 | 6/2017 | Hoppe et al. |
| 2019/0225371 | A1 | 7/2019 | Hoppe et al. |
| 2020/0147781 | A1 | 5/2020 | Squiers et al. |
| 2020/0165036 | A1 | 5/2020 | Squiers et al. |
| 2023/0122425 | A1 | 4/2023 | Camp et al. |

FOREIGN PATENT DOCUMENTS

| | | |
|---|---|---|
| CN | 204561464 | 8/2015 |
| CN | 106142031 | 11/2016 |
| CN | 205835254 | 12/2016 |
| CN | 208215295 | 12/2018 |
| CN | 109227493 | 1/2019 |
| CN | 109719687 | 5/2019 |
| CN | 208930204 | 6/2019 |
| CN | 111267056 | 6/2020 |
| CN | 211841922 | 11/2020 |
| CN | 212919321 | 4/2021 |
| KR | 10-2009-0088156 | 8/2009 |
| WO | WO21059264 | 4/2021 |

OTHER PUBLICATIONS

Husky 1.8 ft. × 3 ft. Portable Jobsite Workbench, Date first available Aug. 11, 2016, [online]retrieved Feb. 9, 2022, available from https://www.amazon.com/Husky-1-8-Portable-Jobsite-Workbench/dp/B079J5F69D (Year: 2016).

Keter—197283 Folding Table Work Bench for Miter Saw Stand, Woodworking Tools and Accessories with Included 12 Inch Wood Clamps—Easy Garage Storage Black/Yellow, Date first available Dec. 14, 2010, [online]retrieved Feb. 9, 2022, available from https://www.amazon.com/Keter-Folding-Workbench-Sawhorse-Capacity/dp/B001CWX26Y/ref=asc_df_B001CWX26Y/?tag=hyprod-20&linkCode=df0&hvadid=167135477708&hvpos=&hvnetw=g&hvrand=99001564571713765&hvpone=&hvptwo=hvqmt=&hvdev=c&hvdvcmdi=&hvlocint=&hvlocphy=9018827&hvtargid=pla-466445506792&psc=1 (Year: 2010).

Lifetime Height Adjustable Craft Camping and Utility Folding Table, 4 Foot, 4'/48 × 24, white Granite, [online]retrieved Feb. 9, 2022, available from https://www.amazon.com/Lifetime-4428-Adjustable-Folding-Utility/dp/B003YJPC2A/ref=asc_df_B003YJPC2A/?tag=hyprod-20&linkCode=df0&hvadid=167166621599&hvpos=&hvnetw=q&hvrand=14332524995067698456&hvpone=&hvptwo=&hvgmt=&hvdev=c&hvdvcmdl=&hvlocint=&hvlocophy=9018827&hvtargid=pla-303379816484&psc=1 , per Amazon, product available as early as Oct. 12, 2013.

Adjustable Folding Table with 2 Heigh Settings by Lavish Home—48 × 24 × 23 or 48 × 24 × 29, [online]retrieved Feb. 9, 2022, available from https://www.overstock.com/Home-Garden/Adjustable-Folding-Table-with-2-Height-Settings-by-Lavish-Home-48-x-24-x-23-or-46-x-24-x-29/29746748/customer-reviews.html , per Wayback, website dates back to Apr. 13, 2020.

Pegasus Folding Work Table & Sawhorse, [online]retrieved Feb. 9, 2022, available from https://www.worx.com/pegasus-work-table-sawhorse-wx051.html , per Wayback, website dates back to Jun. 2, 2017.

* cited by examiner

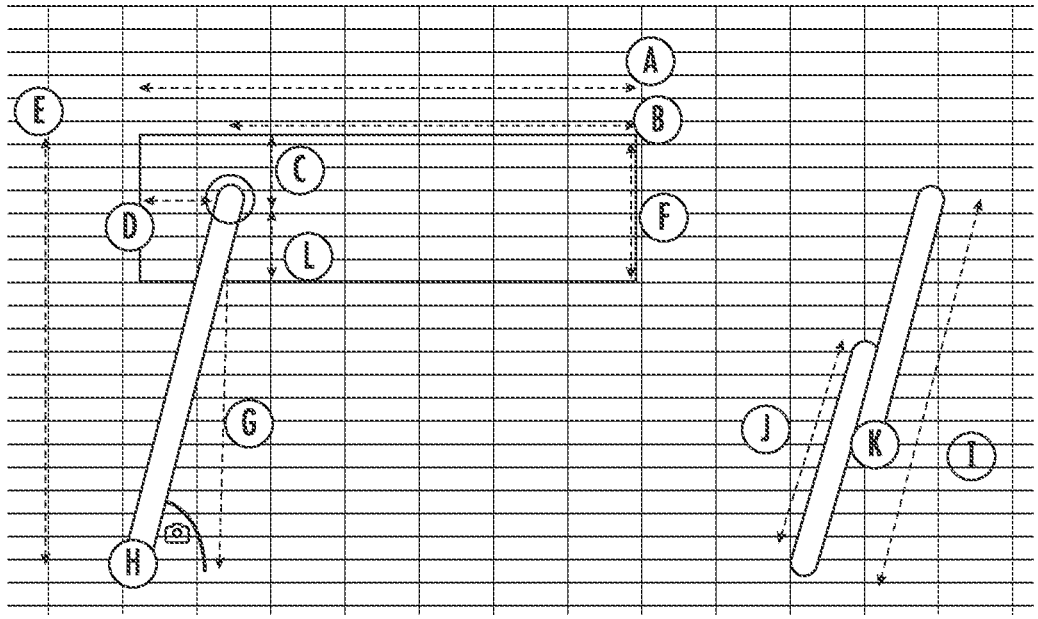

FIG. 48

| | | | | | | | |
|---|---|---|---|---|---|---|---|
| | FOLDED HEIGHT | 209.55 | 8.25 | INCHES | | | |
| | TABLE BODY HEIGHT | 204.775 | 4.125 | INCHES | | | |
| | LENGTH | 455.5051126 | 17.33 | INCHES | | | |
| | OVERHANG OF LEGS IN BACK | 25.50511262 | 1.004138292 | INCHES | 430 MAX TO FIT ON RTC | | |
| A | OVERALL LENGTH | RESULT | B+D | mm | 455.5051 | leg + AREA PAST PIVOT | |
| B | FOLDING END TO LEG PIVOT | VARIABLE | J | mm | 425.5051 | | |
| C | TABLE TOP TO LEG PIVOT | VARIABLE | F+L | mm | 74.775 | | |
| D | SHORT END OF LEG PIVOT | FIXED | 30 | mm | 10 | | |
| E | OVERALL TABLE HEIGHT | FIXED | 812.8 | mm | 812.5 | | |
| F | TABE TOP HEIGHT | INPUT | USER INPUT | mm | 304.775 | | |
| G | LEG PIVOT TO GROUND | VARIABLE | E+C | mm | 758.1225 | | |
| H | LEG ANGLE | FIXED | 80 | DEG | 1.390268 | | |
| I | ANGLED LENGTH OF LEG | VARIABLE | G/sin(H) | mm | 109.4102 | | |
| J | LENGTH OF EACH LEG PORTION | VARIABLE | (I+K)*.5 | mm | 425.5051 | | |
| K | LEG OVERLAP (4 INCHES) | FIXED | 101.6 | mm | 101.6 | | |
| L | BOTTOM TABLE TO PIVOT (35 min) | FIXED | 30 | mm | 30 | | |
| | TOP HALF OF LEG IS | 425.5051126 | | | | | |
| | BOTTOM HALF OF LEG IS | 450.9051126 | TO ACCOUNT FOR PART OF J HANGING OUT FOR GRABBING | | | | |

FIG. 49

WORK STRUCTURE FOR USE WITH MODULAR STORAGE SYSTEM

CROSS-REFERENCE TO RELATED PATENT APPLICATIONS

The present application is a continuation of International Application No. PCT/US2022/014334, filed Jan. 28, 2022, which claims the benefit of and priority to U.S. Provisional Application No. 63/271,969, filed on Oct. 26, 2021, U.S. Provisional Application No. 63/246,124, filed on Sep. 20, 2021, U.S. Provisional Application No. 63/234,394, filed on Aug. 18, 2021, U.S. Provisional Application No. 63/176,548, filed on Apr. 19, 2021, U.S. Provisional Application No. 63/157,156, filed on Mar. 5, 2021, and U.S. Provisional Application No. 63/156,075, filed on Mar. 3, 2021, and U.S. Provisional Application No. 63/144,140, filed on Feb. 1, 2021, each of which are incorporated herein by reference in their entirety.

BACKGROUND OF THE INVENTION

The present disclosure is directed generally to the field of tool storage systems and related devices. The present disclosure relates specifically to a device that includes a work surface and a coupling mechanism to detachably couple the device to another device or container, such as in a modular storage system.

Tool storage units are often used to transport tools and tool accessories. Some storage units are designed to incorporate into a modular storage system. Within a modular storage system, different units, devices and/or containers may provide varying functions, such as providing a collapsible device that includes a work surface.

SUMMARY OF THE INVENTION

One embodiment of the invention relates to a foldable work platform. The foldable work platform includes a housing, a first support structure pivotally coupled to the housing, a second support structure pivotally coupled to the housing, a first clip and a second clip. The housing includes a work surface. The first support structure and the second support structure are configured to collectively support the housing. The housing extends along a longitudinal axis between a first lateral side and an opposing second lateral side. The first clip extends from the first lateral side of the housing, and the first clip is configured to detachably couple the foldable work platform to a first vertical rail extending from a modular storage unit. The second clip extends from the second lateral side of the housing, and the second clip is configured to detachably couple the foldable work platform to a second vertical rail distinct from the first vertical rail, the second vertical rail extending from the modular storage unit.

Another embodiment of the invention relates to a foldable work platform configured to couple to a modular storage unit. The foldable work platform includes a first housing, a second housing pivotally coupled to the first housing, a first support structure pivotally coupled to the first housing, a second support structure pivotally coupled to the second housing, a first plurality of male couplers coupled to the first support structure, and a second plurality of male couplers coupled to the second support structure. The first housing includes a first work surface, and the second housing includes a second work surface. The second housing is pivotally coupled to the first housing such that the first housing and the second housing are configured to actuate between an open configuration and a closed configuration. The first work surface and the second work surface are coplanar when the first housing and the second housing are positioned in the open configuration. The first support structure and the second support structure are configured to collectively support the first housing and the second housing when the first housing and the second housing are positioned in the open configuration. The first plurality of male couplers are configured to couple the foldable work platform to a first surface of a stackable storage unit. The second plurality of male couplers configured to couple the foldable work platform to the first surface of the stackable storage unit.

Another embodiment of the invention relates to a foldable work platform configured to couple to a modular storage unit. The foldable work platform includes a first housing, a second housing pivotally coupled to the first housing, a first support structure pivotally coupled to the first housing, a second support structure pivotally coupled to the second housing, a first plurality of coupling components coupled to the first support structure, and a second plurality of coupling components coupled to the second support structure. The first housing includes a first work surface, and the second housing includes a second work surface. The second housing is pivotally coupled to the first housing such that the first housing and the second housing are configured to actuate between an open configuration and a closed configuration, and the first work surface and the second work surface are coplanar when the first housing and the second housing are positioned in the open configuration. The first support structure and the second support structure are configured to collectively support the first housing and the second housing when the first housing and the second housing are positioned in the open configuration. The first plurality of coupling components are configured to couple the foldable work platform to a stackable storage unit. The second plurality of coupling components are configured to couple the foldable work platform to the stackable storage unit. The first plurality of coupling components and the second plurality of coupling components face away from each other when the first housing and the second housing are configured in the closed configuration.

Another embodiment of the invention relates to a foldable work system including a first foldable work platform and a second foldable work platform configured to couple to the first foldable work platform. The first foldable work platform includes a first frame, a first support structure pivotally coupled to the first frame configured to support the first frame, a second support structure pivotally coupled to the first frame configured to support the first frame, and a first male coupler extending from the first frame. The first male coupler includes a first tongue extending in a first direction and a second tongue extending in a second direction opposite the first direction. The second foldable work platform includes a second frame, a third support structure pivotally coupled to the second frame configured to support the second frame, a fourth support structure pivotally coupled to the second frame configured to support the second frame, and a first female coupler extending from the second frame. The female coupler includes a first rib and a second rib extending over and offset from the second frame. The first rib and the second rib are configured to slideably engage with the first tongue and the second tongue, respectively, thereby detachably coupling the first foldable work platform and the second foldable work platform.

In various embodiments the first foldable work platform and the second foldable work platform slideably engage with each other via the first foldable work platform sliding vertically relative to the second foldable work platform.

Another embodiment of the invention relates to a foldable work platform including a frame, a plate removeably coupled to the frame, the plate defining an upper surface and an opposing lower surface, a first support structure pivotally coupled to the frame configured to support the frame, a second support structure pivotally coupled to the frame configured to support the frame, and a first plurality of male couplers extending from the first leg. The plurality of male couplers are configured to couple to a first surface of a stackable storage unit. Each of the first plurality of male couplers include a first tongue extending in a first direction and a second tongue extending in a second direction opposite the first direction. The first leg rotates with respect to the frame about a first axis. The second leg rotates with respect to the frame about a second axis, and the second axis is closer to the lower surface than the first axis.

Another embodiment of the invention relates to a foldable work platform including a first housing, a second housing pivotally coupled to the first housing, a first support structure pivotally coupled to the first housing, and a second support structure pivotally coupled to the second housing. The first housing and the second housing include a first planar work surface and a second planar work surface, respectively. A first plurality of coupling components extend from the first support structure. The first plurality of coupling components couple to a first surface of a modular unit, such as a modular, stackable storage unit.

Another embodiment of the invention relates to a foldable work platform including a housing including a planar work surface, a plurality of wheels rotateably coupled to the housing, a first support structure pivotally coupled to the housing, and a second support structure pivotally coupled to the housing. A first plurality of coupling components are coupled to the first support structure. The first plurality of coupling components couple the housing to a first surface of a stackable storage unit.

Another embodiment of the invention relates to a foldable work platform including a housing, a frame pivotally coupled to the housing, a handle that extends from the frame, a plurality of wheels rotateably coupled to the frame, and a support structure pivotally coupled to the housing. The housing includes a planar work surface. A first plurality of coupling components are coupled to the frame. The first plurality of coupling components couple the housing to a stackable storage unit.

Another embodiment of the invention relates to a foldable work platform including a housing, a first support structure coupled to the housing, and a second support structure pivotally coupled to the housing. The housing includes a planar work surface. A first plurality of coupling components are coupled to the first support structure. The first plurality of coupling components couple the housing to a first surface of a stackable storage unit.

Another embodiment of the invention relates to a device including a first panel defining a top planar surface, a second panel pivotally coupled to the first panel, and a support leg extending from the first panel. The second panel includes a coupling mechanism engageable to a modular storage unit. The support leg is configured to engage with a floor when the top planar surface is arranged in a generally horizontal orientation.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which:

FIG. 48 is a schematic view of the device of FIG. 33, according to an exemplary embodiment.

FIG. 49 is a list of measurements and sizes of the device of FIG. 48, according to an exemplary embodiment.

DETAILED DESCRIPTION

Referring generally to the figures, various embodiments of a device providing a work surface are shown. One or more of the devices are configured to selectively couple and decouple to storage units within a modular storage system. At constructions sites there can be few surfaces and/or platforms to support object, documents, etc. Described herein are various portable and stackable devices that provide one or more surfaces, such as writing surfaces, that can be selectively coupled and decoupled with a modular storage system, such as a modular tool storage system.

Figure 1:
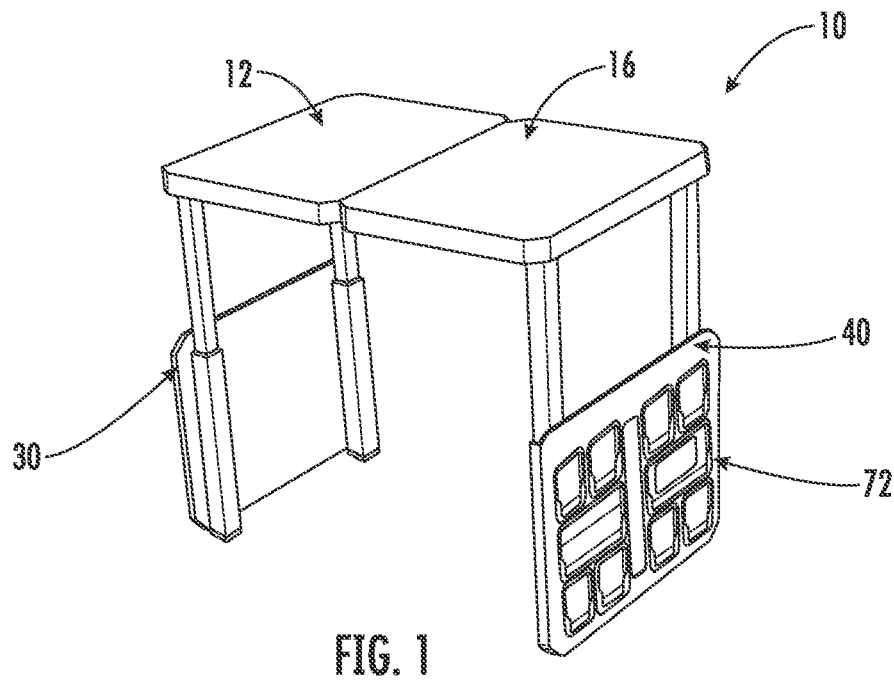
FIG. 1 is a perspective view of a device including a work surface, according to an exemplary embodiment.
Figure 2:
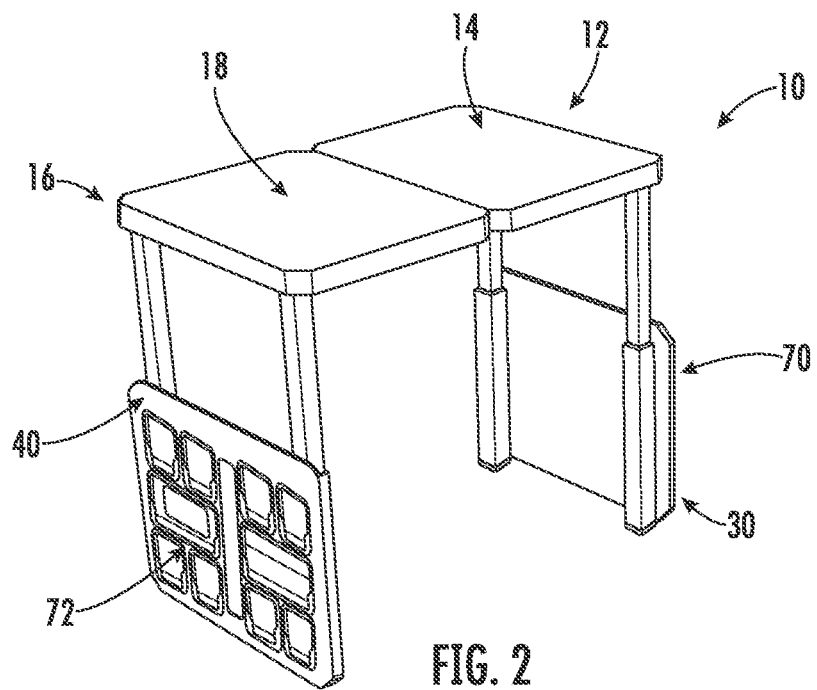
FIG. 2 is a perspective view of the device of FIG. 1, according to an exemplary embodiment.
Figure 3:
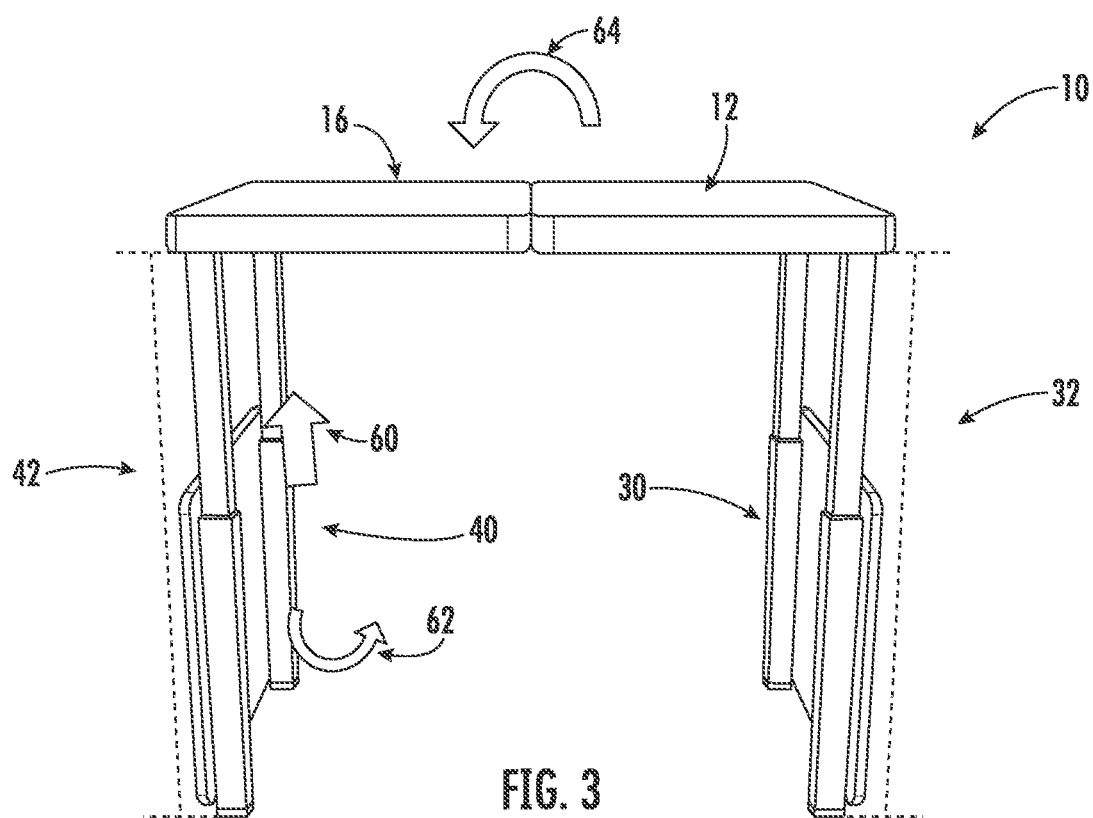
FIG. 3 is a side view of the device of FIG. 1, according to an exemplary embodiment.
Figure 4:
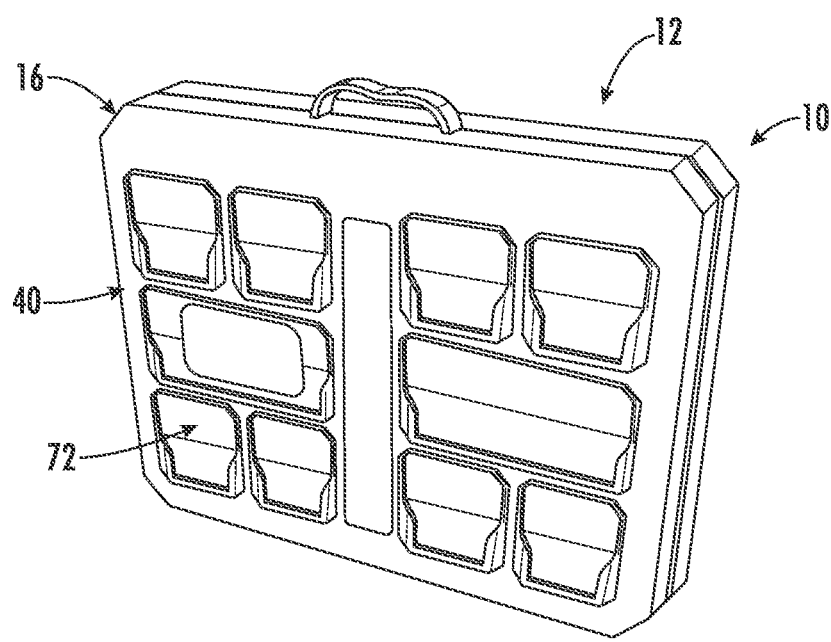
FIG. 4 is a perspective view of the device of FIG. 1 shown in a closed configuration, according to an exemplary embodiment.
Figure 5:
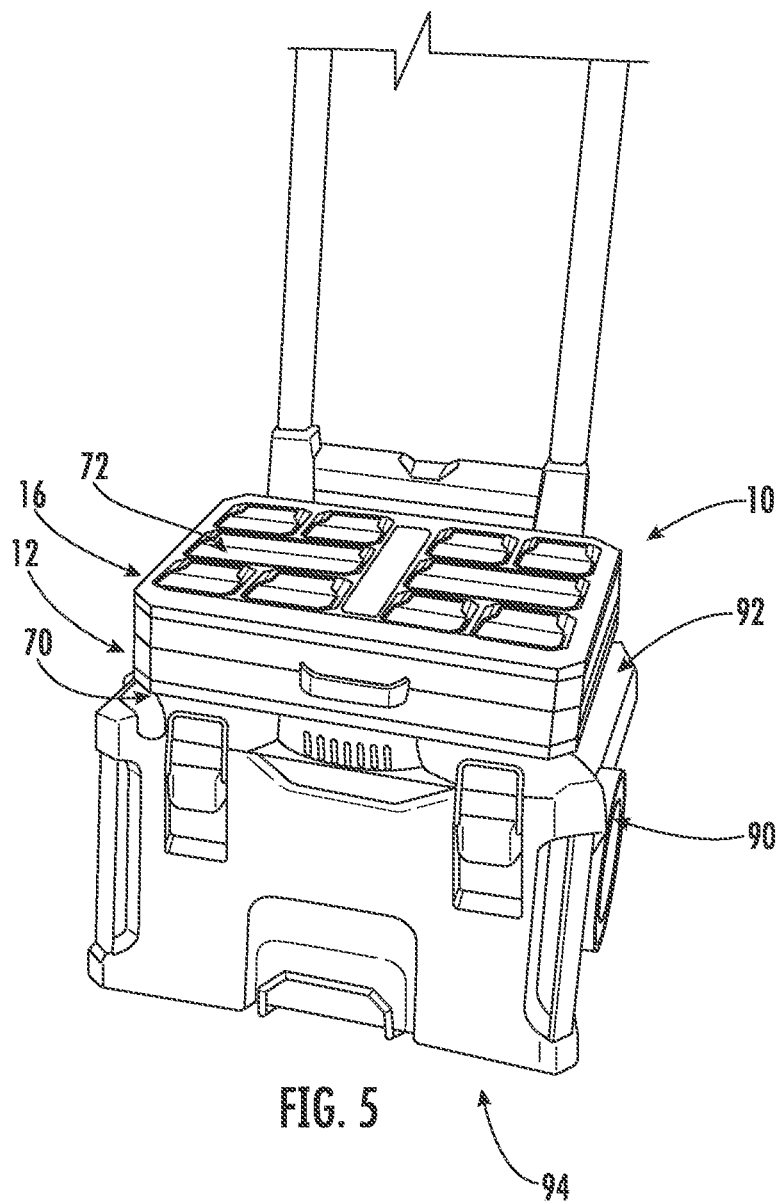
FIG. 5 is a perspective view of the device of FIG. 1 shown coupled to a modular unit, according to an exemplary embodiment.

Referring to FIGS. 1-5, a stackable, foldable, and transportable device including a work surface, shown as foldable work platform 10, is shown according to an exemplary embodiment. In a specific embodiment, foldable work platform 10 expands into a platform for performing work, such as a table. In FIG. 1, foldable work platform 10 is shown in an expanded position providing a surface for performing work. In FIG. 5, foldable work platform 10 is shown in a collapsed position coupled to a modular storage system. FIG. 3 depicts a series of steps to transition foldable work platform 10 from an expanded orientation (FIG. 2) to a collapsed configuration (FIG. 4).

First housing 12 includes a first work surface, shown as first planar work surface 14. Second housing 16 is pivotally coupled to first housing 12. Second housing 16 includes a second working surface, shown as second planar work surface 18. In a specific embodiment, first planar work surface 14 and second planar work surface 18 are co-planar when first housing 12 and second housing 16 are pivoted fully open with respect to each other.

A first structure that supports first housing 12, shown as first support structure 30, is pivotally coupled to first housing 12. In a specific embodiment, first support structure 30 includes two legs extending from first housing 12. A second structure that supports second housing 16, shown as second support structure 40, is pivotally coupled to second housing 16. In a specific embodiment, second support structure 40 includes two legs extending from second housing 16. When foldable work platform 10 is in an expanded and/or open configuration (FIG. 1), first support structure 30 and second support structure 40 support first housing 12 and second housing 16 above the ground and/or surface that foldable work platform 10 is resting on. In this arrangement, one or more of first planar work surface 14 and/or second planar work surface 14 provide a surface for performing work, such as a writing surface.

First support structure 30 includes one or more coupling mechanisms, shown as first plurality of coupling components 70. In a specific embodiment, first plurality of coupling components 70 extend from first support structure 30. Second support structure 40 includes one or more coupling mechanisms, shown as second plurality of coupling components 72. In various embodiments, foldable work platform 10 includes one or more coupling interfaces, such as first plurality of coupling components 70 and second plurality of coupling components 72, latches and/or recesses that are compatible with the coupling mechanism(s) described in International Patent Application No. PCT/US2018/044629, which is incorporated herein in its entirety. It is to be understood that various embodiments of the embodiments described herein utilize female couplers, male couplers, and/or latches as described in International Patent Application No. PCT/US2018/044629.

FIG. 3 depicts exemplary steps for transitioning foldable work platform 10 from an open configuration (FIG. 2) to a collapsed and/or closed configuration (FIG. 4). First, second support structure 40 is retracted towards second housing 16 in direction 60, and first support structure 30 is similarly retracted towards first housing 12. In a specific embodiment, second support structure 40 extends and retracts a varying length 42 from second housing 16, and first support structure 30 extends and retracts a varying length 32 from first housing 12.

Next, second support structure 40 is pivoted in direction 62 towards second housing 16. Similarly, first support structure 30 is pivoted towards first housing 12. Finally, first housing 12 is pivoted towards second housing 16 in direction 64 until foldable work platform 10 is in the closed configuration (FIG. 4).

In various embodiments, foldable work platform 10 can be coupled to one or more modular units, shown as modular and stackable storage unit 90, in a modular storage system. In a specific embodiment, first plurality of coupling components 70 couple with a first surface, shown as upper surface 92, of stackable storage unit 90 (FIG. 5). In this way, foldable work platform 10 can be transitioned to a closed configuration (FIG. 4) and coupled to stackable storage unit 90 (FIG. 5) for easier transportation of both foldable work platform 10 and stackable storage unit 90. In a specific embodiment, second plurality of coupling components 72 couple with a second surface opposite upper surface 92, shown as lower surface 94, of stackable storage unit 90. In various embodiments, coupling components 70 include one or more male couplers and coupling components 72 include one or more female couplers configured to receive male couplers.

Figure 6:
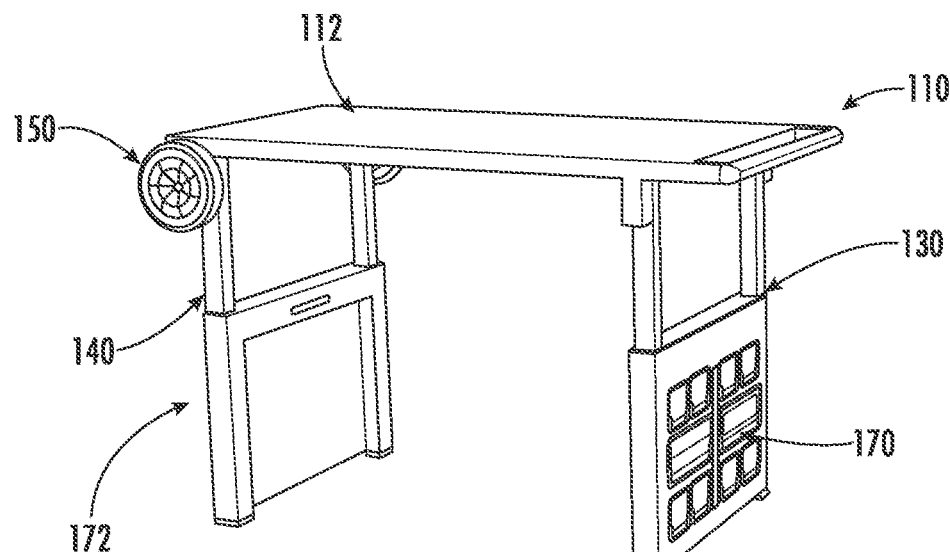
FIG. 6 is a perspective view of a device including a work surface, according to an exemplary embodiment.
Figure 7:
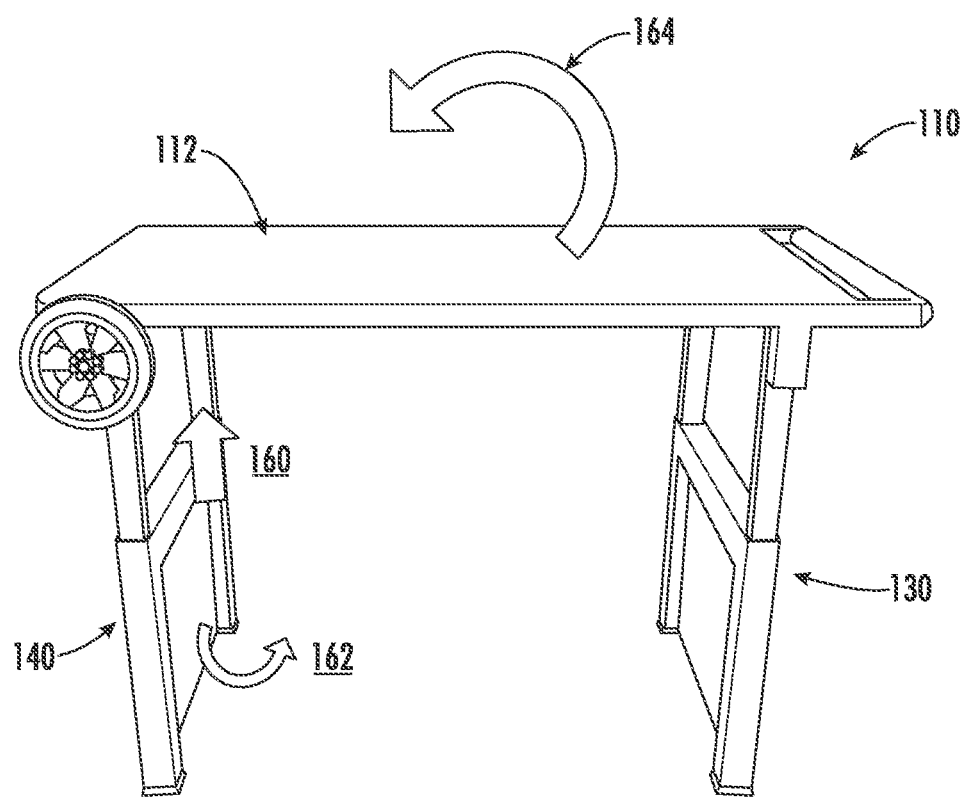
FIG. 7 is a side view of the device of FIG. 6, according to an exemplary embodiment.
Figure 8:
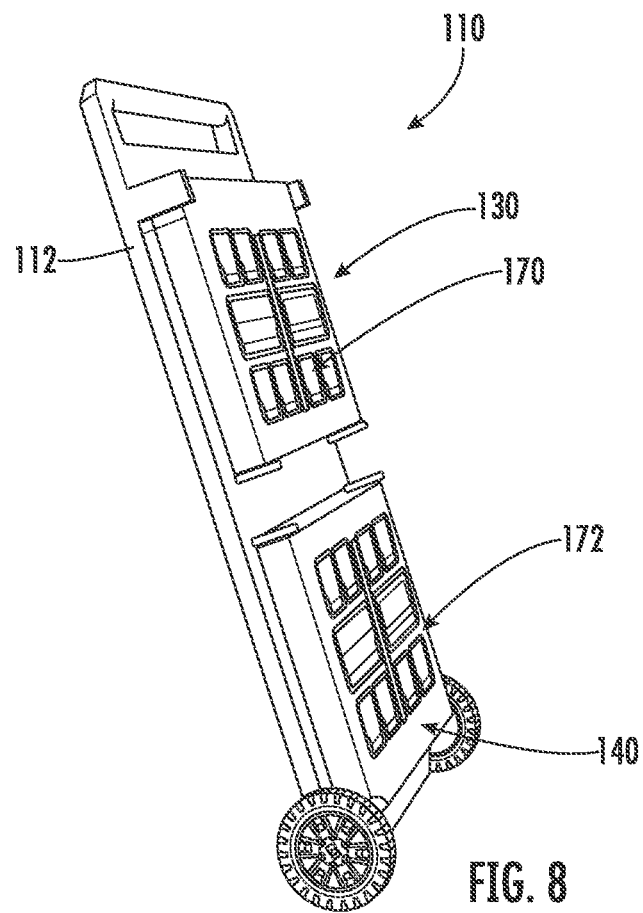
FIG. 8 is a perspective view of the device of FIG. 6 shown in a closed configuration, according to an exemplary embodiment.
Figure 9:
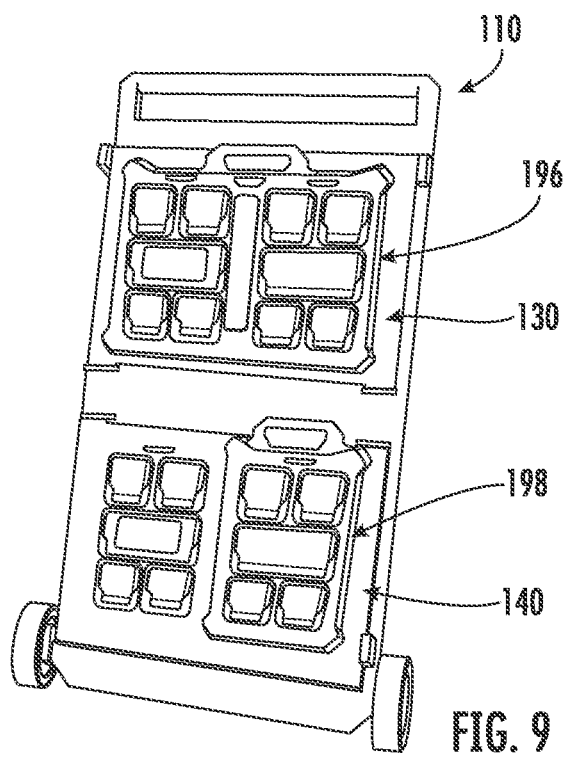
FIG. 9 is a perspective view of the device of FIG. 6 shown coupled to two modular units, according to an exemplary embodiment.

Referring to FIG. 6-9, foldable work platform 110 is shown according to an exemplary embodiment. Foldable work platform 110 is similar to foldable work platform 10 with the exception of the differences described. In a specific embodiment, foldable work platform 110 expands into a table. In FIG. 6, foldable work platform 110 is shown in an expanded position providing a surface for performing work. In FIG. 8, foldable work platform 110 is shown in the collapsed position. FIG. 7 depicts a series of steps to transition foldable work platform 110 from an expanded orientation (FIG. 6) to a collapsed configuration (FIG. 8).

One or more transportation structures, shown as plurality of wheels 150, are rotateably coupled to housing 112. First support structure 130 and second support structure 140 are pivotally coupled to housing 112. First plurality of coupling components 170 are coupled to first support structure 130, and second plurality of coupling components 172 are coupled to second support structure 140.

FIG. 7 depicts exemplary steps for transitioning foldable work platform 110 from an open configuration (FIG. 6) to a closed configuration (FIG. 8). First, second support structure 140 is retracted towards housing 112 in direction 160, and first support structure 130 is similarly retracted towards housing 112. In a specific embodiment, first support structure 130 and second support structure 140 extend and retract a varying length from housing 112. Next, second support structure 140 is pivoted in direction 162 towards housing 112, and first support structure 130 is similarly pivoted towards housing 112. Finally, housing 112 is pivoted in direction 164 to the upright position (FIG. 8).

In various embodiments, foldable work platform 110 can be coupled to one or more modular units, shown as modular and stackable storage unit 196 and modular and stackable storage unit 198.

Figure 10:
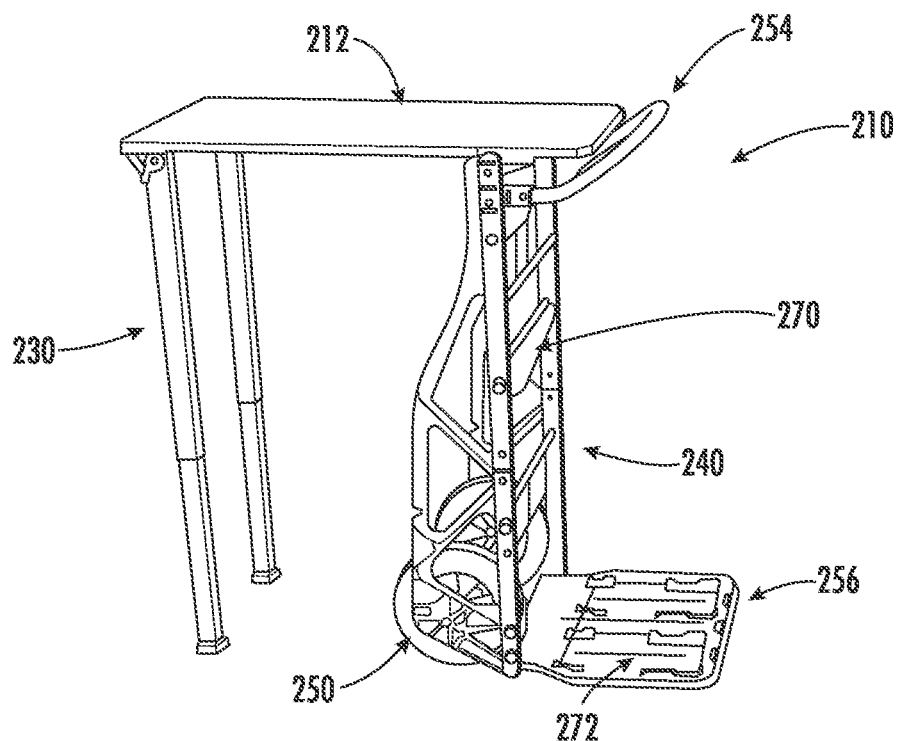
FIG. 10 is a perspective view of a device including a work surface, according to an exemplary embodiment.
Figure 11:
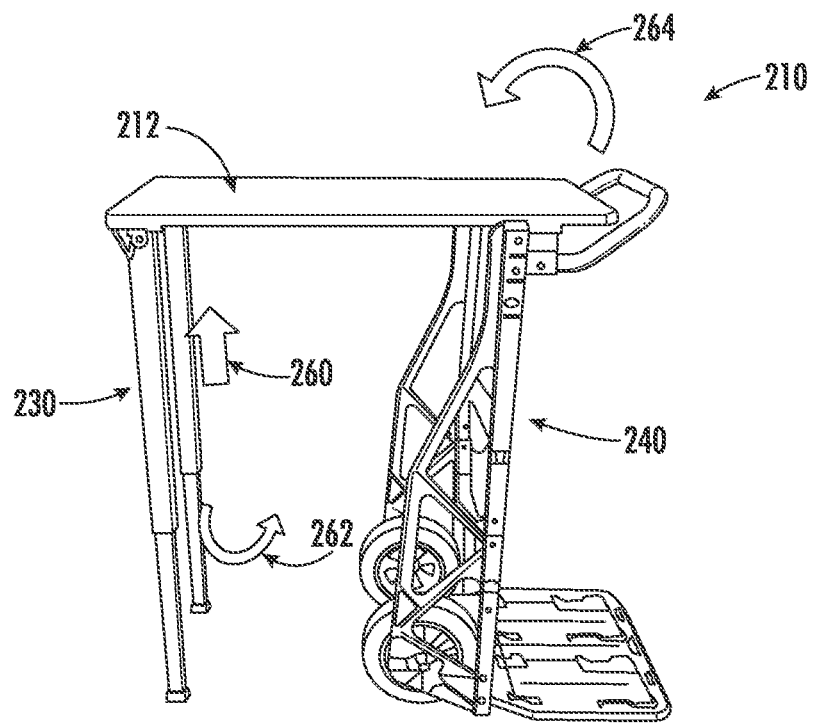
FIG. 11 is a side view of the device of FIG. 10, according to an exemplary embodiment.
Figure 12:
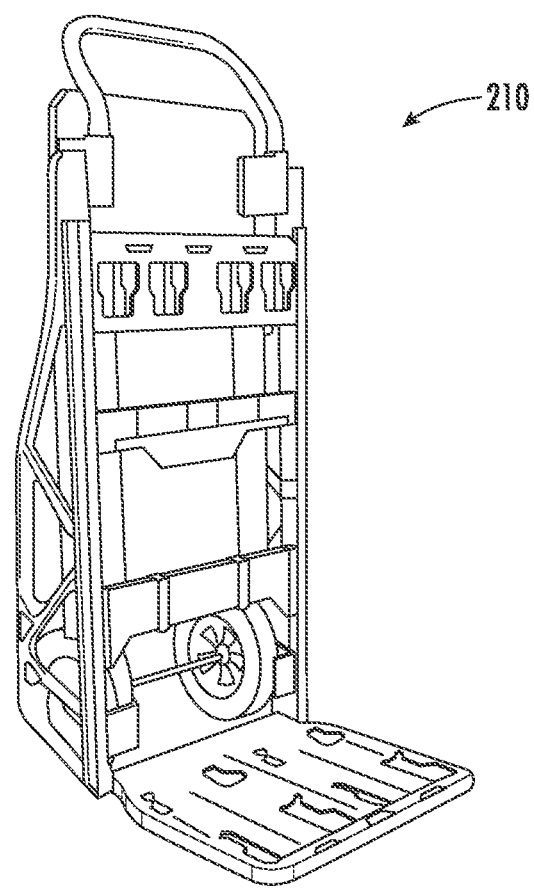
FIG. 12 is a perspective view of the device of FIG. 10 shown in a closed configuration, according to an exemplary embodiment.

Referring to FIG. 10-13, foldable work platform 210 is shown according to an exemplary embodiment. Foldable work platform 210 is similar to foldable work platform 10 and foldable work platform 110 with the exception of the differences described. In a specific embodiment, foldable work platform 210 expands into a table. In FIG. 10, foldable work platform 210 is shown in an expanded position providing a surface for performing work. In FIG. 12, foldable work platform 210 is shown in the collapsed position coupled to a modular storage system. FIG. 11 depicts a series of steps to transition foldable work platform 210 from an expanded orientation (FIG. 10) to a collapsed configuration (FIG. 12).

First support structure 230 and second support structure 240 are pivotally coupled to housing 212. One or more transportation structures, shown as plurality of wheels 250, are rotateably coupled to second support structure 240. In a specific embodiment, second support structure includes a frame structure (FIG. 10). First plurality of coupling components 270 are coupled to second support structure 140. Base 256 extends from second support structure 240 opposite handle 254. Second plurality of coupling components 272 are coupled to base 256.

FIG. 11 depicts exemplary steps for transitioning foldable work platform 210 from an open configuration (FIG. 10) to a closed configuration (FIG. 12). First, first support structure 230 is retracted towards housing 212 in direction 260. In a specific embodiment, first support structure 230 extends and retracts a varying length from housing 212. Next, first support structure 130 is pivoted in direction 262 towards housing 212. Finally, housing 212 is pivoted in direction 264 to the upright position (FIG. 12).

Figure 13:
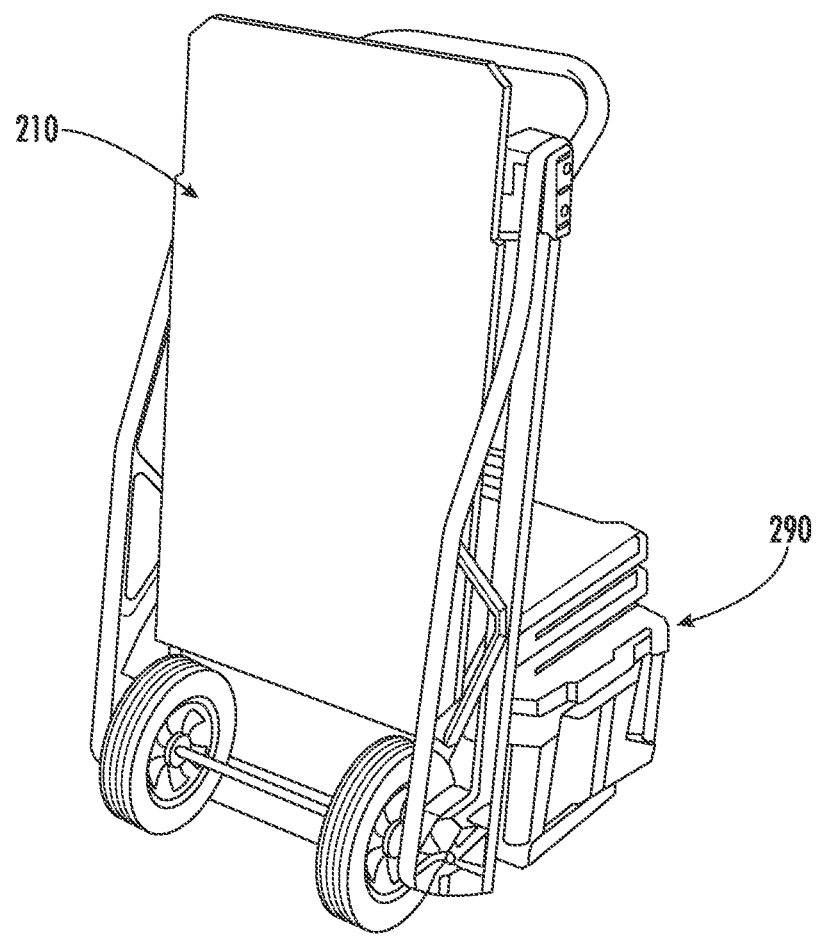
FIG. 13 is a perspective view of the device of FIG. 10 shown coupled to one or more modular units, according to an exemplary embodiment.

In various embodiments, foldable work platform 210 can be coupled to one or more modular units, shown as modular and stackable storage unit 290 (FIG. 13).

Figure 14:
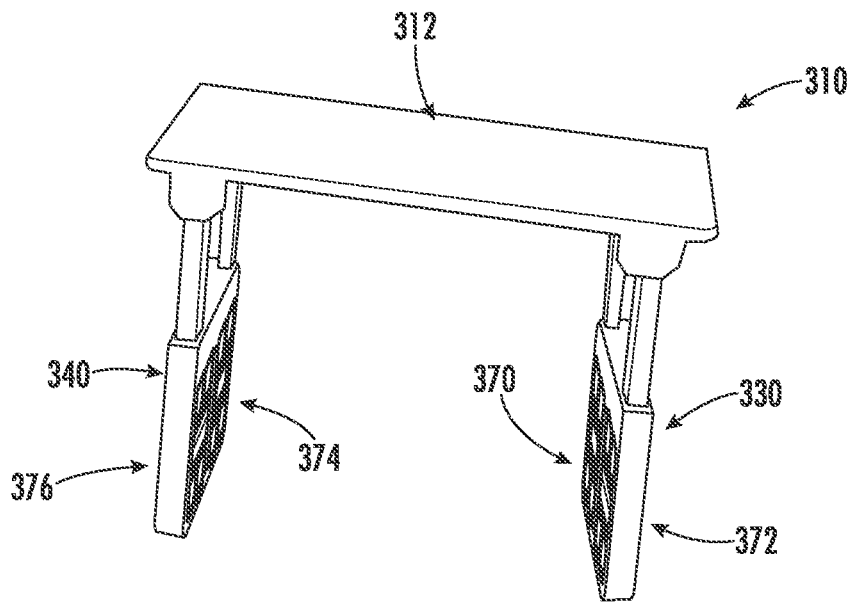
FIG. 14 is a perspective view of a device including a work surface, according to an exemplary embodiment.
Figure 15:
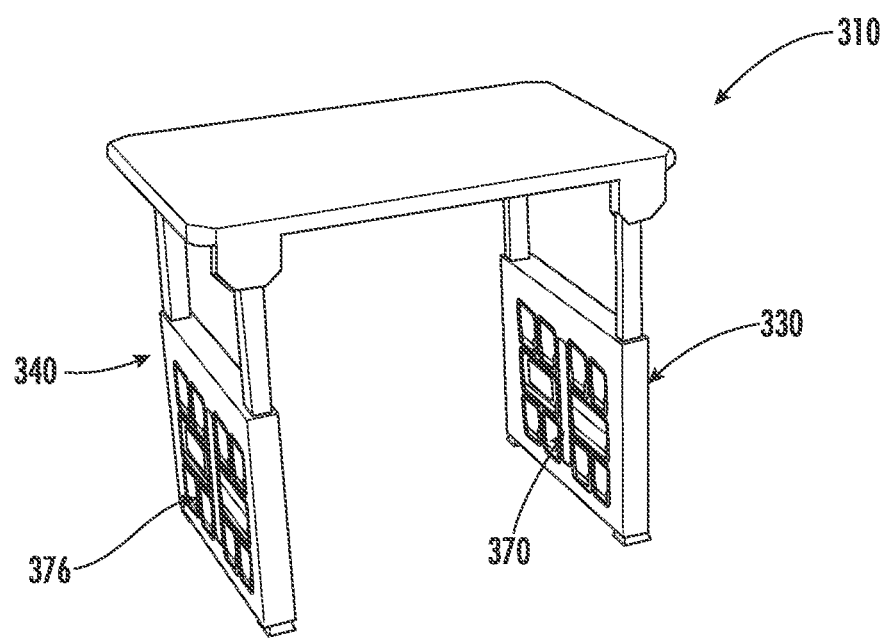
FIG. 15 is a perspective view of the device of FIG. 14, according to an exemplary embodiment.
Figure 16:
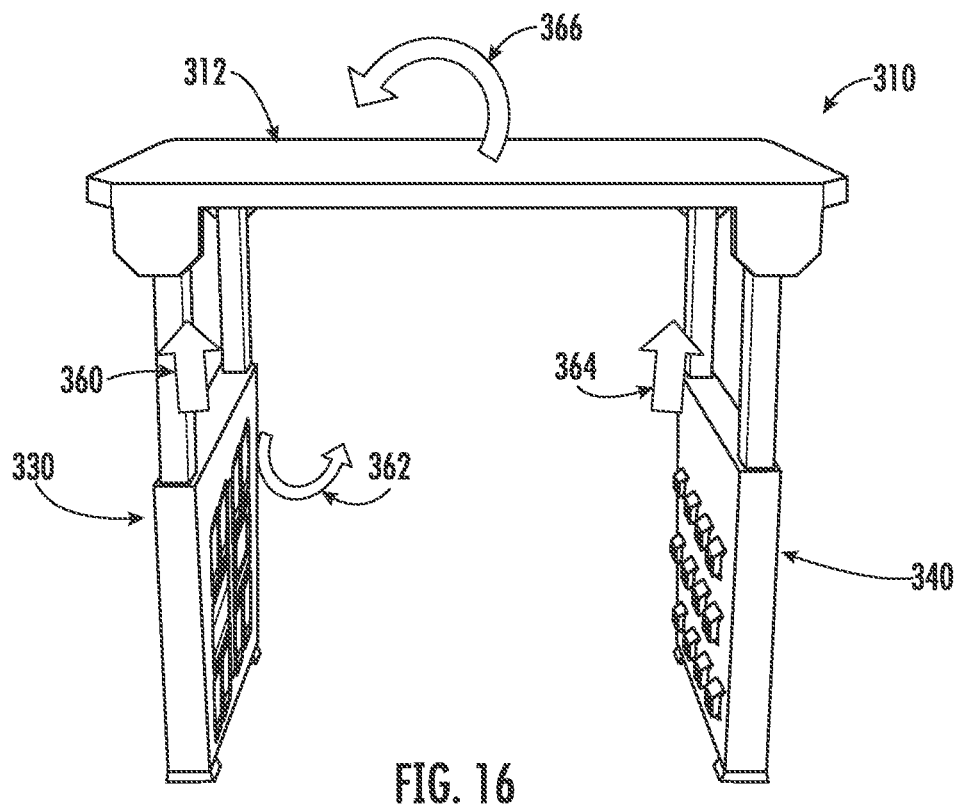
FIG. 16 is a side view of the device of FIG. 14, according to an exemplary embodiment.
Figure 17:
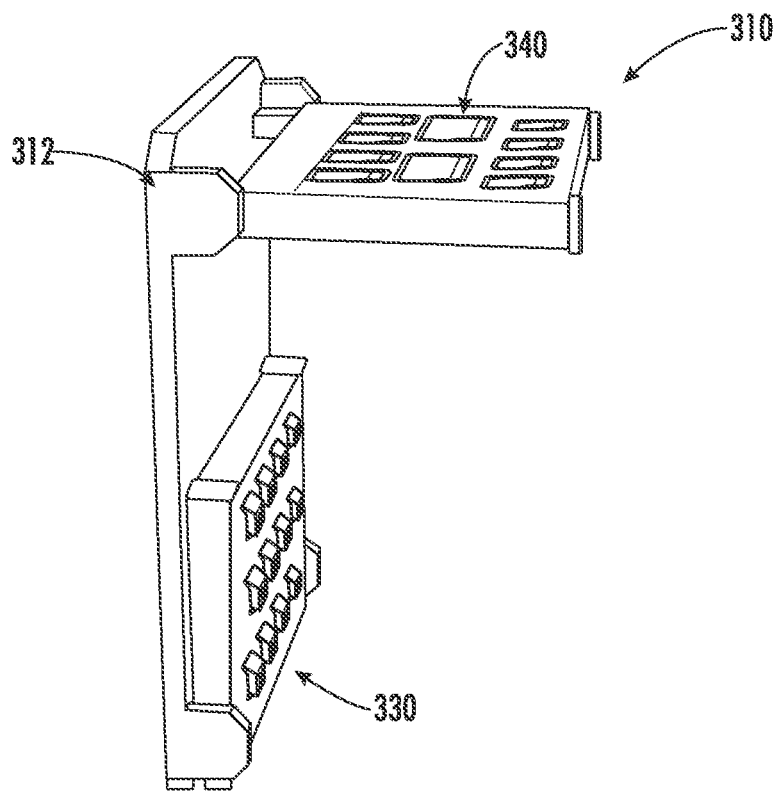
FIG. 17 is a perspective view of the device of FIG. 14 shown in a closed configuration, according to an exemplary embodiment.
Figure 18:
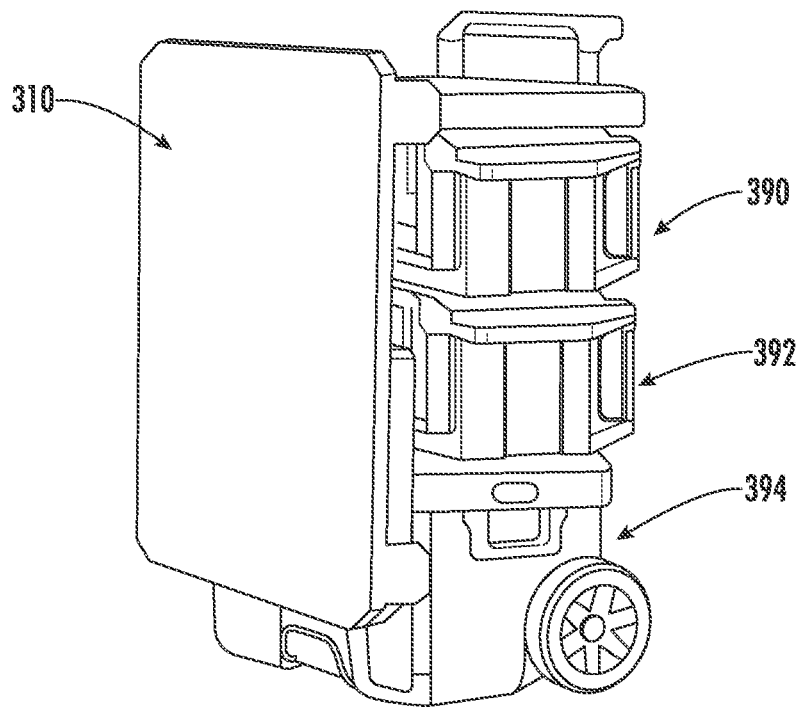
FIG. 18 is a perspective view of the device of FIG. 14 shown coupled to one or more modular units, according to an exemplary embodiment.
Figure 19:
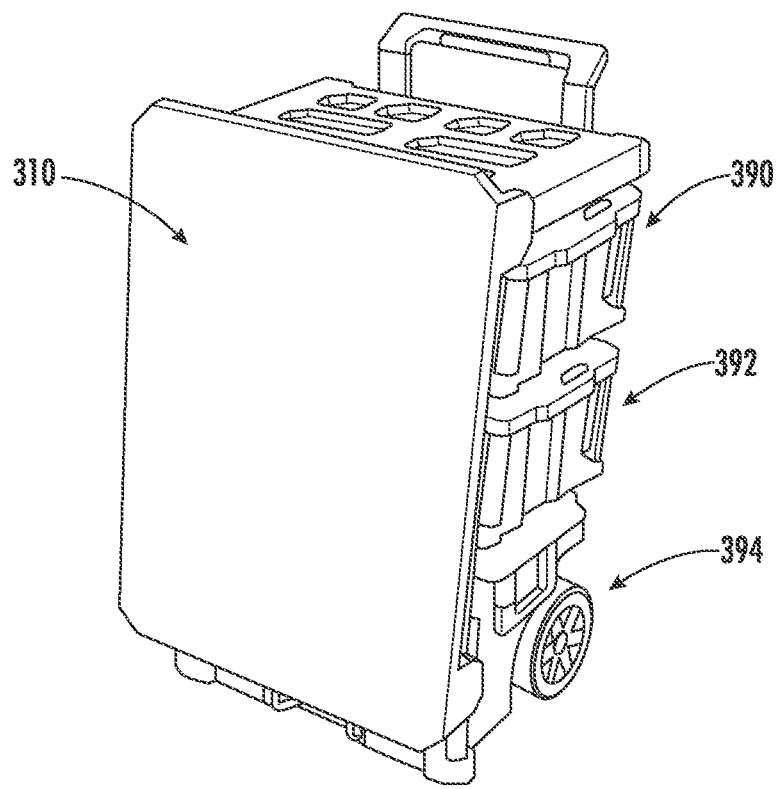
FIG. 19 is a perspective view of the device of FIG. 14 shown coupled to one or more modular units, according to an exemplary embodiment.

Referring to FIG. 14-19, foldable work platform 310 is shown according to an exemplary embodiment. Foldable work platform 310 is similar to foldable work platform 10, foldable work platform 110 and foldable work platform 210 with the exception of the differences described. In a specific embodiment, foldable work platform 310 expands into a table. In FIG. 14, foldable work platform 310 is shown in an expanded position providing a surface for performing work. In FIG. 17, foldable work platform 310 is shown in the collapsed position coupled to a modular storage system. FIG. 16 depicts a series of steps to transition foldable work platform 310 from an expanded orientation (FIG. 15) to a collapsed configuration (FIG. 17).

First support structure 330 and second support structure 340 are pivotally coupled to housing 312. First plurality of coupling components 370 are coupled to first support structure 330, and second plurality of coupling components 372 are coupled to first support structure 330 opposite first plurality of coupling components 370. Similarly, third plurality of coupling components 374 are coupled to second support structure 340, and fourth plurality of coupling components 376 are coupled to second support structure 340 opposite third plurality of coupling components 374.

FIG. 16 depicts exemplary steps for transitioning foldable work platform 310 from an open configuration (FIG. 15) to a closed configuration (FIG. 17). First, first support structure 330 is retracted towards housing 312 in direction 360, and second support structure 340 is similarly retracted towards housing 312. In a specific embodiment, first support structure 330 and second support structure 340 extend and retract a varying length from housing 312. Next, first support structure 330 is pivoted in direction 362 towards housing 312. Finally, housing 312 is pivoted in direction 364 to the upright position (FIG. 17). From the upright position, foldable work platform 310 can be coupled to one or more modular units, shown as modular storage units 390, 392 and 394. In this way foldable work platform 310 can be easily coupled and transported with one or more modular storage units.

Figure 20:
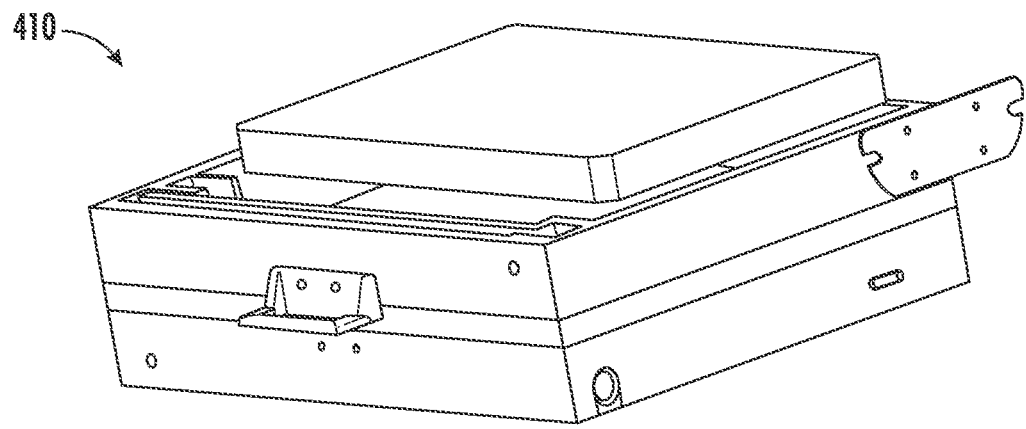
FIG. 20 is a perspective view from above of a device including a work surface, according to an exemplary embodiment.
Figure 21:
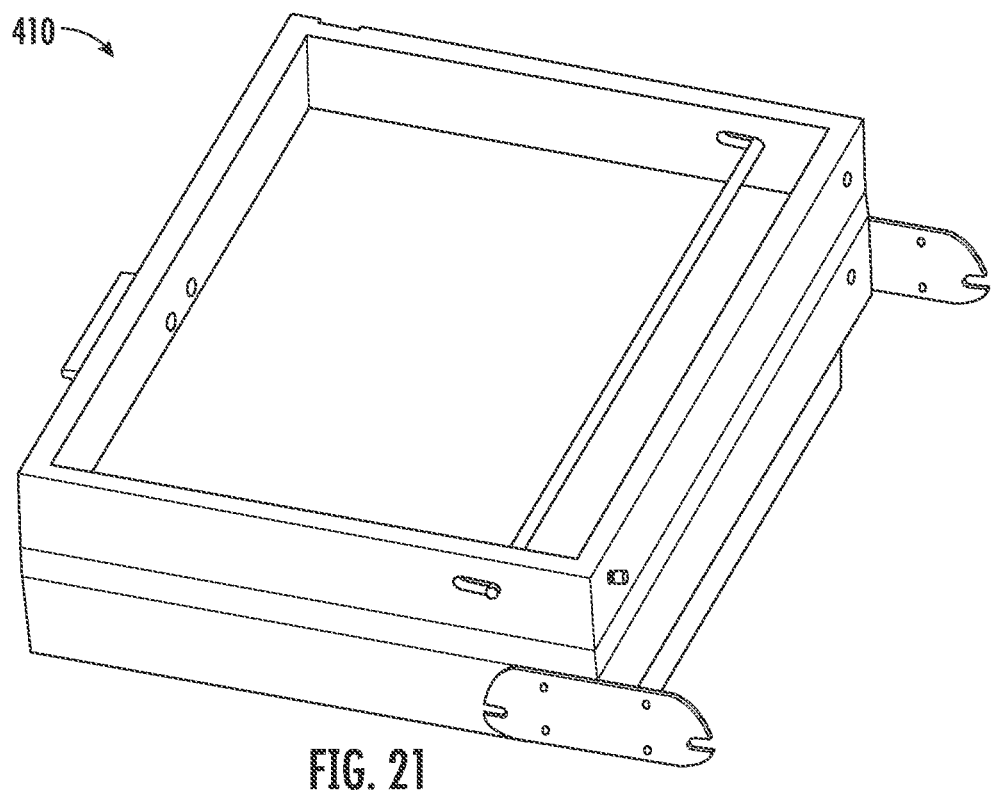
FIG. 21 is a perspective view from below of the device of FIG. 20, according to an exemplary embodiment.
Figure 22:
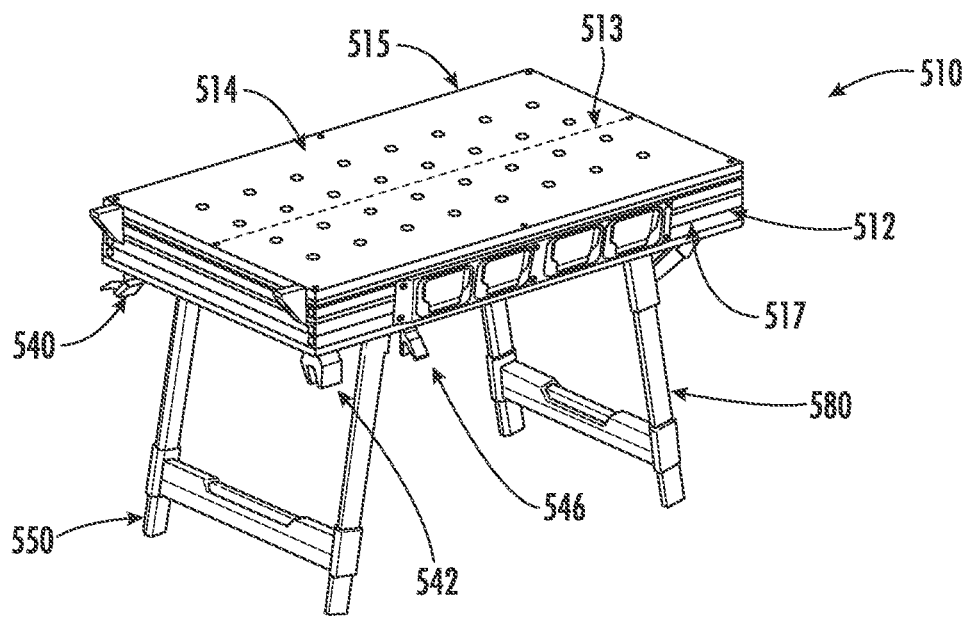
FIG. 22 is a perspective view from above of a device including a work surface, according to another exemplary embodiment.

Referring to FIG. 20-21, foldable work platform 410 is shown according to an exemplary embodiment. Foldable work platform 410 is similar to foldable work platform 10, foldable work platform 110, foldable work platform 210 and foldable work platform 310 with the exception of the differences described.

In a specific embodiment, foldable work platform 410 expands into a table and retracts into a suitcase-style shape similar to foldable work platform 10. In a specific embodiment, foldable work platform 410 includes a biasing element, such as a spring-loaded bar, that locks the foldable work platform 410 in the open configuration and/or the locked configuration.

In a specific embodiment, foldable work platform 410 includes a biasing element, such as magnets, configured to bias and/or hold the legs open when foldable work platform 410 is in the open configuration. In a specific embodiment, the magnets are positioned at a bottom of the table when foldable work platform 410 is in the open configuration.

Referring to FIG. 22-33, foldable work platform 510 is shown according to an exemplary embodiment. Foldable work platform 510 is similar to foldable work platform 10, foldable work platform 110, foldable work platform 210, foldable work platform 310 or foldable work platform 410 with the exception of the differences described.

Foldable work platform 510 is configured to couple to a unit, such as modular storage unit 590. Foldable work platform 510 includes housing 512 including a work surface, shown as planar work surface 514, defined by a top of housing 512. Housing 512 extends along a longitudinal axis 513 between a first lateral side 515 and an opposing second lateral side 517 (e.g., first lateral side 515 and/or second lateral side 517 extend along and/or parallel to longitudinal axis 513). A first support structure, shown as leg 550, and a second support structure, shown as leg 580, are pivotally coupled to housing 512. When extended, leg 550 and leg 580 collectively support housing 512 and planar work surface 514 a distance above the ground surface. Lower portions 570 of leg 550 and leg 580 are slidably engaged with upper portions 552 to permit the height of foldable work platform 510 to be adjusted. Leg 550 and leg 580 are configured to actuate between an extended position in which leg 550 and leg 580 extend from the housing 512, and a retracted position in which each of leg 550 and leg 580 are at least partially retracted within the housing 512. In various embodiments, foldable work platform 510 includes a lower wall 516 slidably coupled to the housing 512, and the lower wall 516 slides in response to leg 550 and leg 580 actuating from the extended position to the retracted position.

Figure 23:
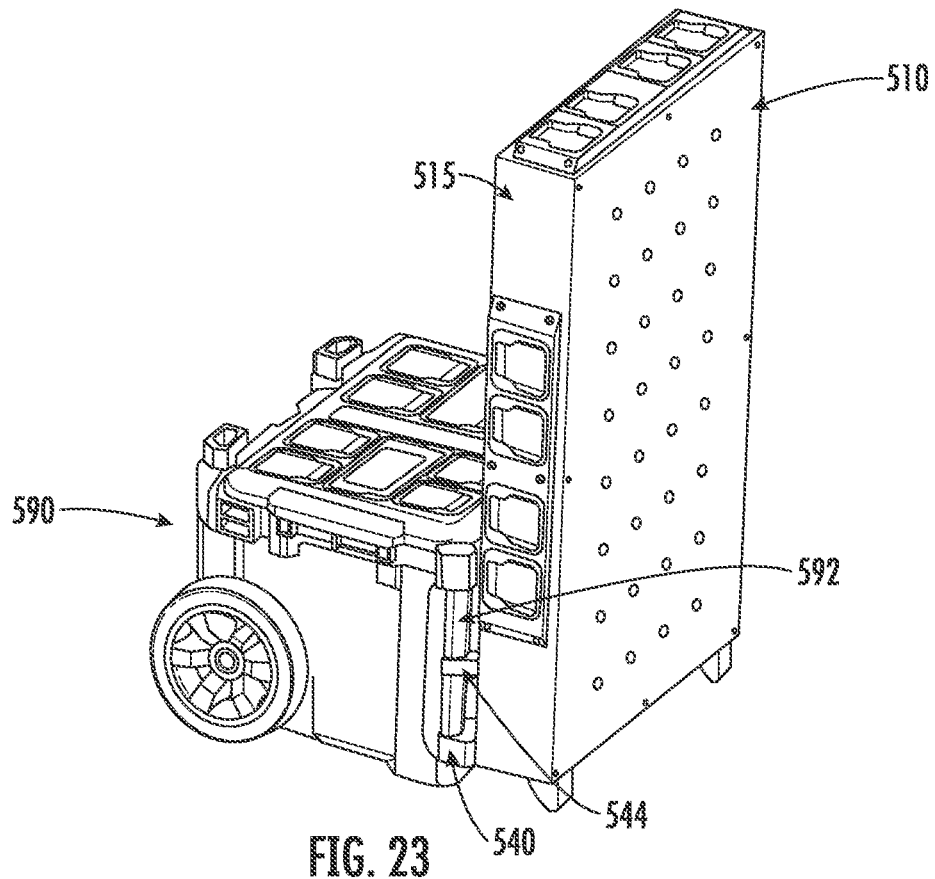
FIG. 23 is a perspective view of the device of FIG. 22 shown coupled to a modular unit, according to an exemplary embodiment.

Foldable work platform 510 includes a first coupling mechanism, shown as clip 540, and a second coupling mechanism, shown as clip 542. Clip 540 extends from first lateral side 515 of housing 512, and clip 542 extends from second lateral side 517 of housing 512. Referring to FIG. 23, clip 540 and clip 542 detachably engage with rail 592 and rail 594, respectively, of modular storage unit 590, with rail 594 being distinct from rail 592 (e.g., extending from a different corner of modular storage unit 590). In various embodiments rail 592 and rail 594 are vertical rails extending from modular storage unit 590. In various embodiments, longitudinal axis 513 extends vertically when the clip 540 and the clip 542 are coupled to the rail 592 and rail 594, respectively. Foldable work platform 510 being coupled to modular storage unit 590 facilitates moving foldable work platform 510, such as by first clipping foldable work platform 510 to modular storage unit 590 and then using the handle of modular storage unit 590 to wheel around both modular storage unit 590 and foldable work platform 510.

In various embodiments foldable work platform 510 includes clip 544, coupled to lateral side 515, and clip 546, coupled to lateral side 517. Clip 544 is configured to detachably couple the foldable work platform 510 to the rail 592, and the clip 544 is positioned above the clip 540 when the clip 540 and the clip 544 are coupled to the first vertical rail 592. Clip 546 is configured to detachably couple the foldable work platform 510 to the rail 594, and the clip 546 is positioned above the clip 542 when the clip 542 and the clip 546 are coupled to the first vertical rail 594. In various embodiments, clip 544 and clip 546 do not include a pivotal element and couple with rails 529, 594 via bending slightly as clip 544 and clip 546 are engaged and disengaged from rails 529, 594.

Figure 24:
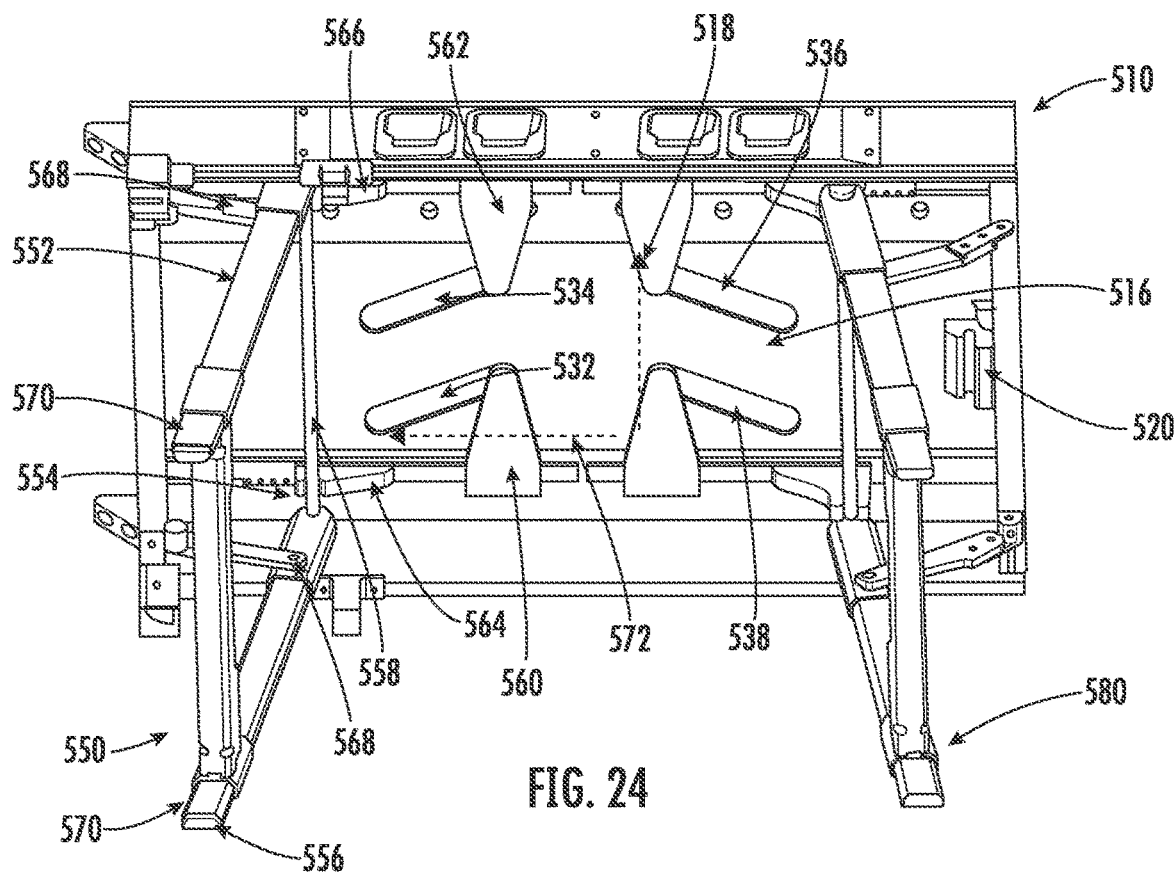
FIG. 24 is a perspective view of the device of FIG. 22 shown in an open configuration, according to an exemplary embodiment.

Referring to FIG. 24, lower wall 516 is slideably coupled to housing 512. As will be described, lower wall 516 slides in a direction opposite direction 518 while first leg 550 and second leg 580 are opened. Lower wall 516 includes one or more recess or apertures, shown as guides 532, 534, 536 and 538, that cause arms 560, 562 interface with to slide lower wall 516.

First leg 550 is pivotally coupled to housing 512. Although the description below is in reference to first leg 550, it will be understood that first leg 550 functions similar to second leg 580 and thus the description below is largely if not equally applicable to second leg 580.

First leg 550 includes upper portion 552, which includes a first end 554 coupled to housing 512 and an opposing second end 556. A support element, shown as cross-bar 558, extends between two elongate portions of upper portion 552. When foldable work platform 510 is in the closed position, cross-bar 558 is coupled to coupling recess 520. Side supports 568 extend between housing 512 and first leg 550. Side supports are pivotally coupled to both housing 512 and first leg 550.

As first leg 550 is closed, lower wall 516 slides in direction 518 because of the angle of guides 532, 534, 536, and 538, and the interface between arms 560 and 562 and the guides. As first leg 550 is closed, first end 554 of upper portion 552 slides in direction 572. As a result of first end 554 moving in direction 572, first interface 564 and second interface 566 also slide in direction 572 because first interface 564 and second interface 566 are engaged with cross-bar 558. First interface 564 and second interface 566 are coupled, such as rigidly coupled, to first arm 560 and second arm 562, respectively.

First arm 560 and second arm 562 are slideably engaged with first guides 532 and second guides 534. As arms 560, 562 move in direction 572, lower wall 516 moves in direction 518. This is because arms 560, 562 interface with the angle of guides 532, 534.

Figure 25:
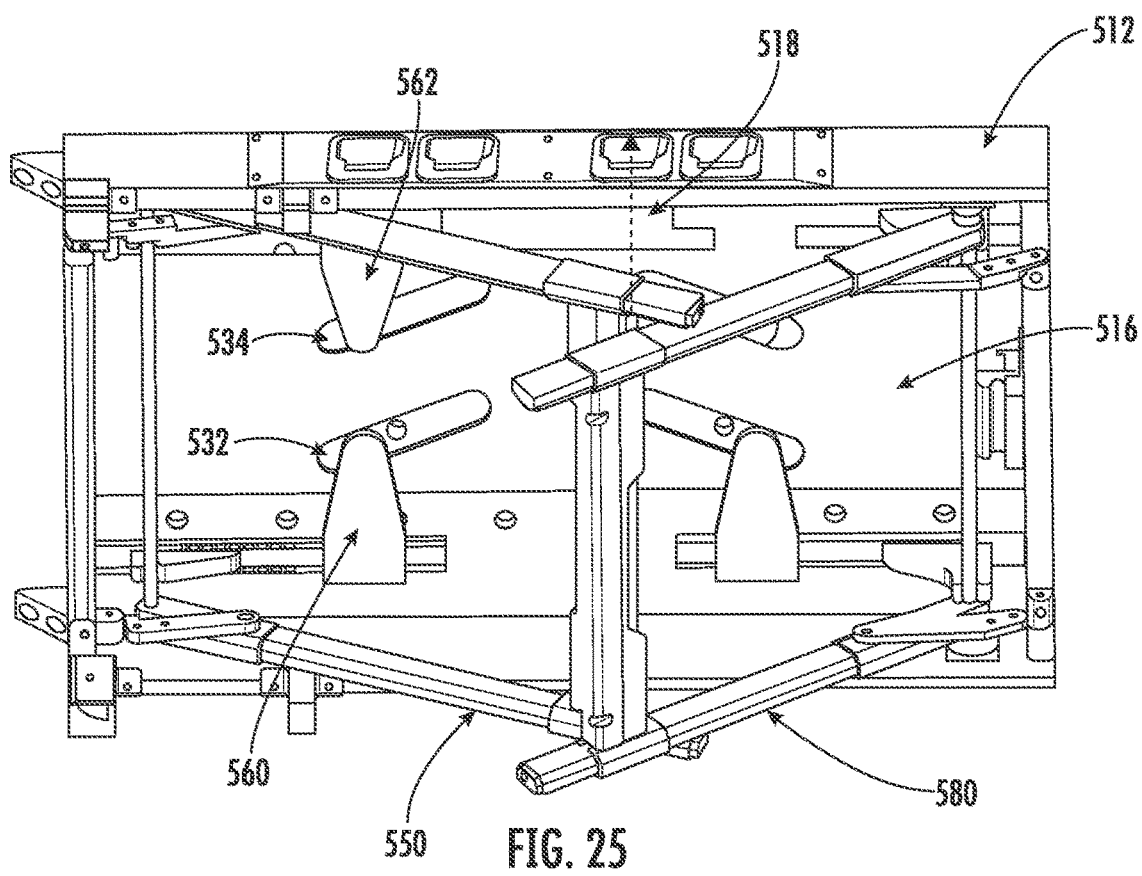
FIG. 25 is a perspective view of the device of FIG. 22 shown in a half-closed configuration, according to an exemplary embodiment.
Figure 26:
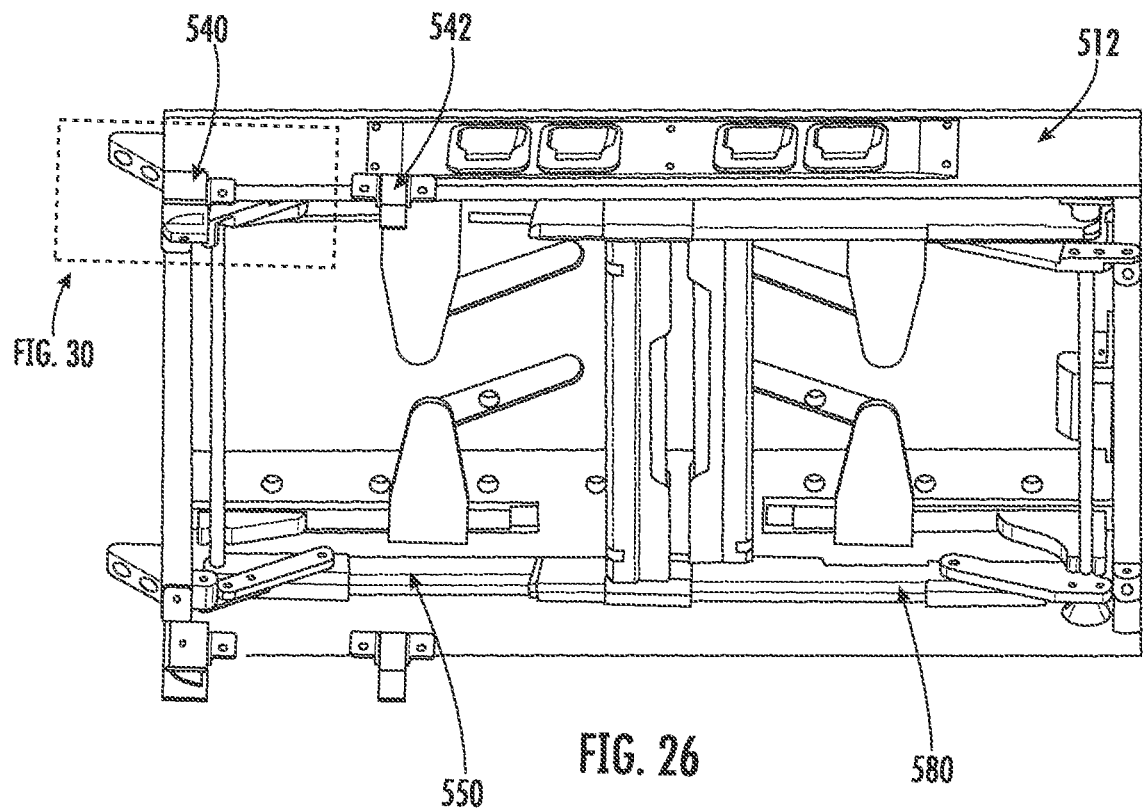
FIG. 26 is a perspective view of the device of FIG. 22 shown in a closed configuration, according to an exemplary embodiment.
Figure 27:
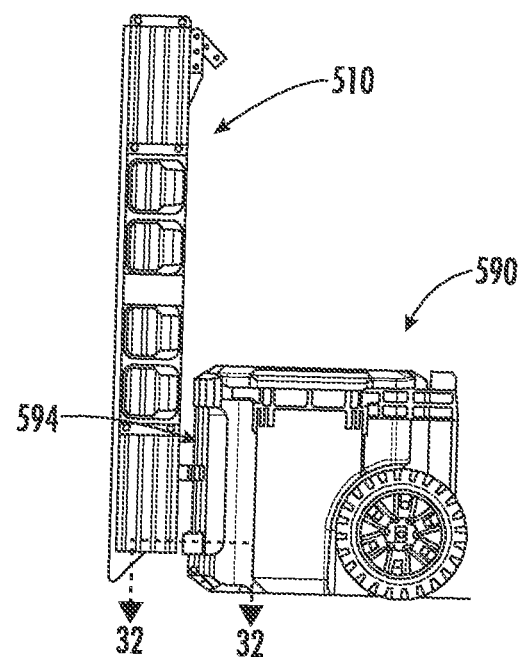
FIG. 27 is a side view of the device of FIG. 22 and the modular storage device of FIG. 23, according to an exemplary embodiment.
Figure 28:
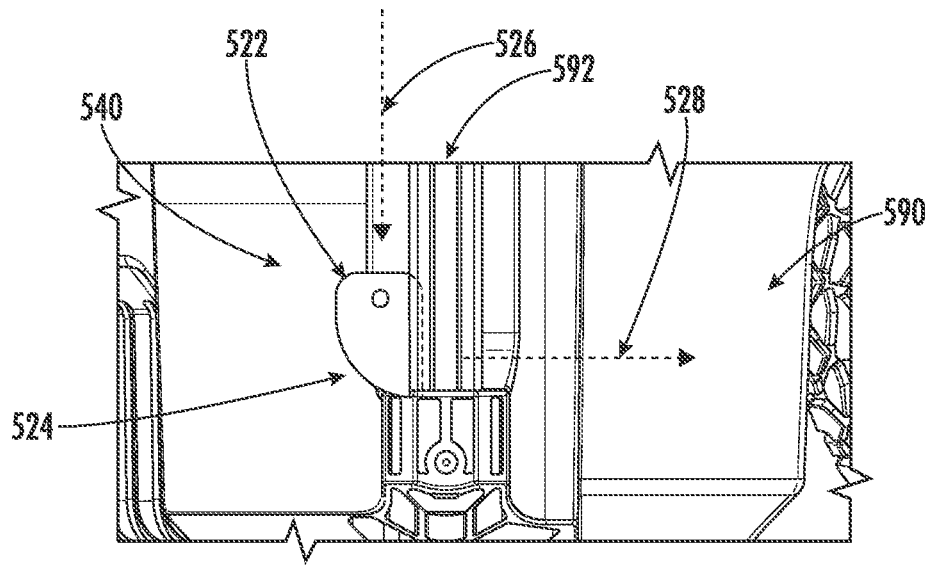
FIG. 28 is a detailed ghost view of the device of FIG. 22 and the modular storage device of FIG. 23, according to an exemplary embodiment.
Figure 29:
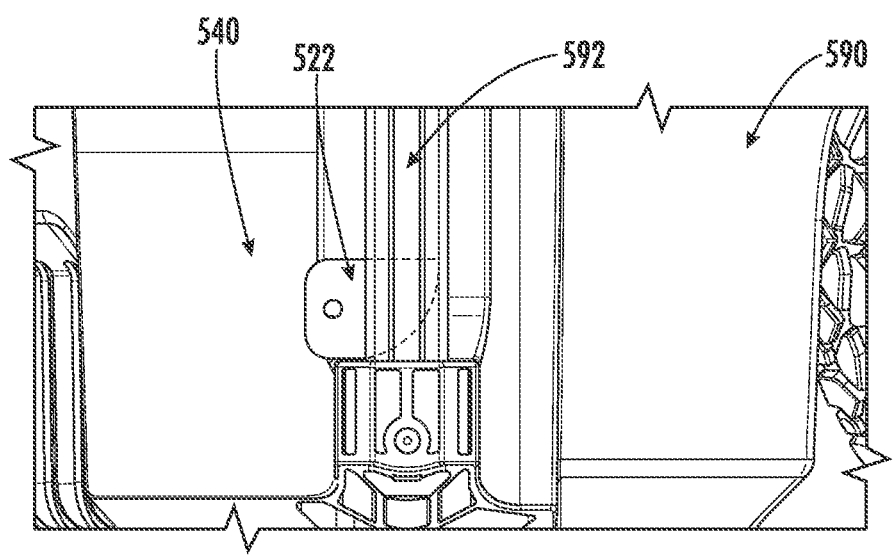
FIG. 29 is a detailed ghost view of the device of FIG. 22 and the modular storage device of FIG. 23, according to an exemplary embodiment.
Figure 30:
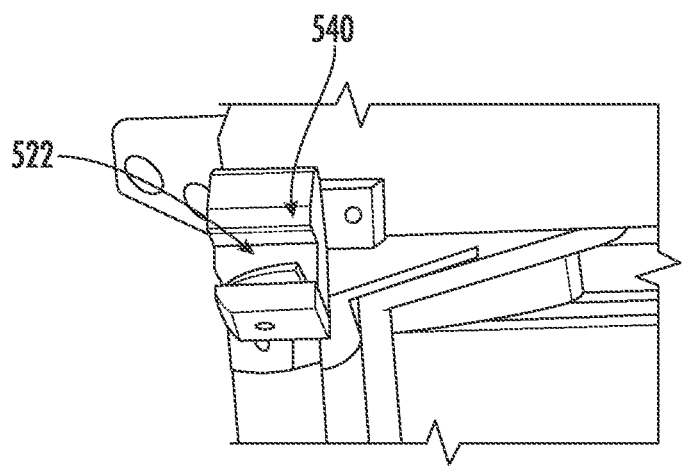
FIG. 30 is a detailed perspective view of the portion identified in FIG. 26 of the device of FIG. 22, according to an exemplary embodiment.
Figure 31:
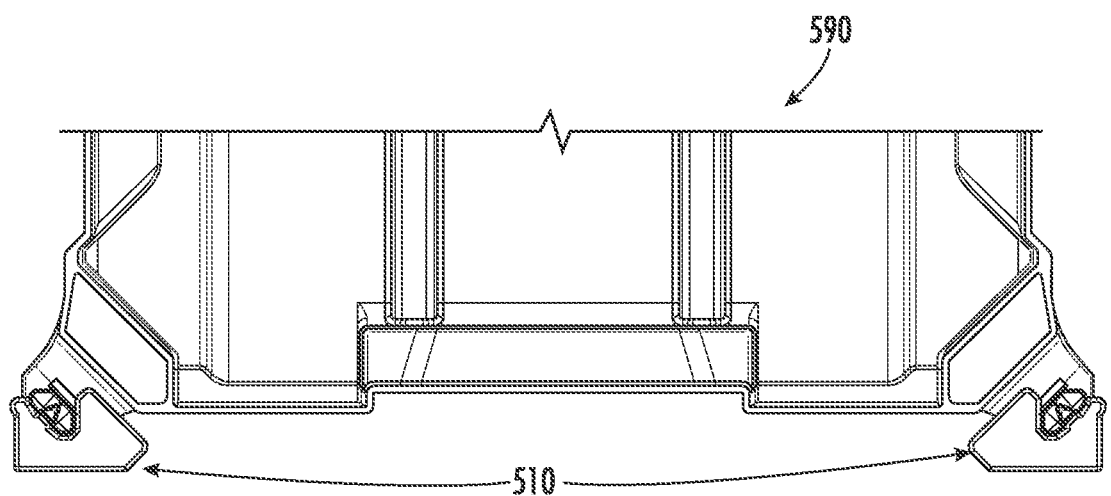
FIG. 31 is a top cross-section view of the device of FIG. 22 and the modular storage device of FIG. 23, according to an exemplary embodiment.

Referring to FIG. 25, when first leg 550 and second leg 580 are partway closed, sliding wall 516 slides in direction 518 with respect to housing 512. When first leg 550 and second leg 580 are closed, first leg 550 and second leg 580 are positioned against or nearly positioned against housing 512.

Referring to FIGS. 27-32, various aspects of coupling foldable work platform 510 to modular storage unit 590 are shown. Clip 540 and clip 542 engage with rail 592 of modular storage unit 590. Clip 540 includes an actuating element, shown as cam 522. In various embodiments, cam 522 is pivotally coupled to housing 512 such that cam 522 actuates between an engaged position and a disengaged position with respect to rail 592, and the cam 522 is in the engaged position when the clip 540 is coupled to the rail 592. In various embodiments, clip 542 similarly includes a cam that engages with rail 594.

Figure 32:
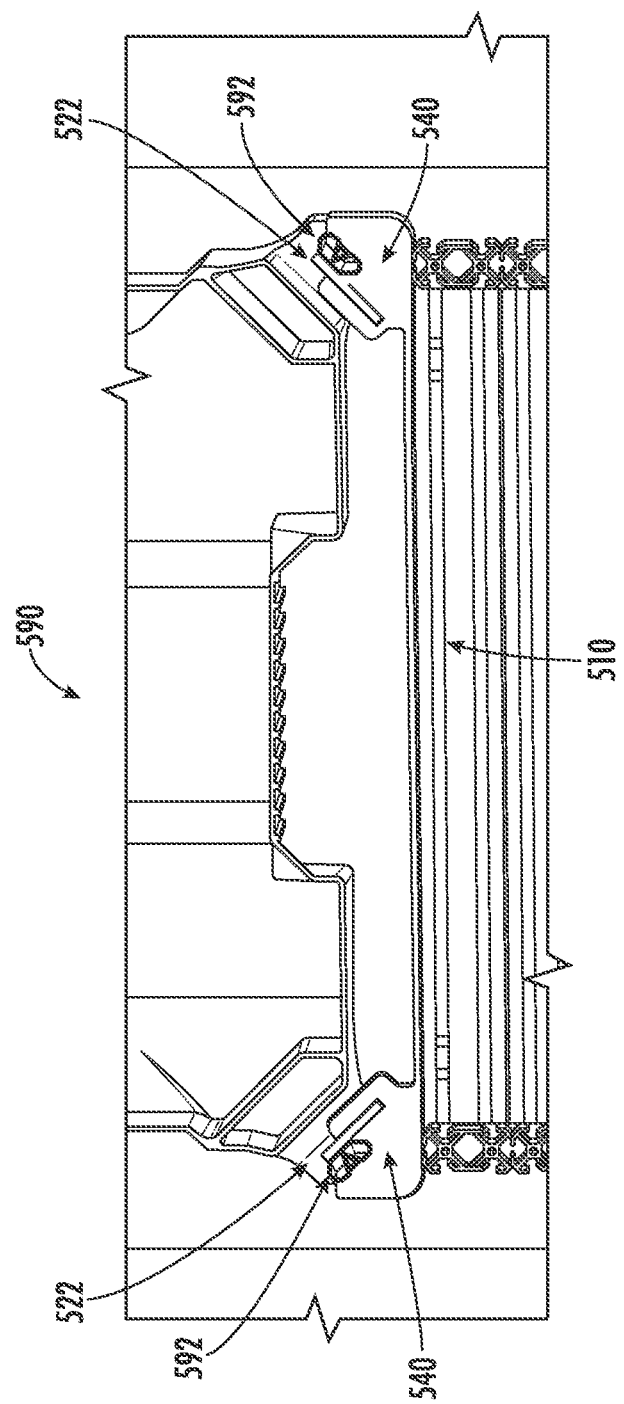
FIG. 32 is a top cross-section view of the device of FIG. 22 and the modular storage device of FIG. 23 taken along line 32-32 in FIG. 27, according to an exemplary embodiment.
Figure 33:
FIG. 33 is a top view of a device including a work surface, according to an exemplary embodiment.
Figure 34:
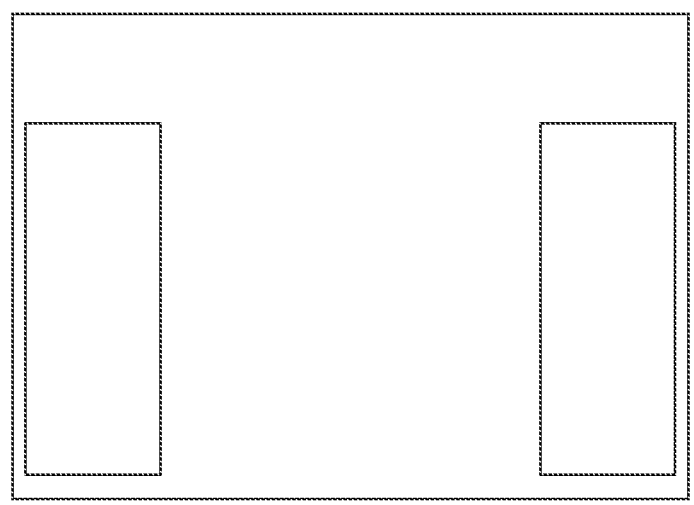
FIG. 34 is a front view of the device of FIG. 33, according to an exemplary embodiment.
Figure 35:
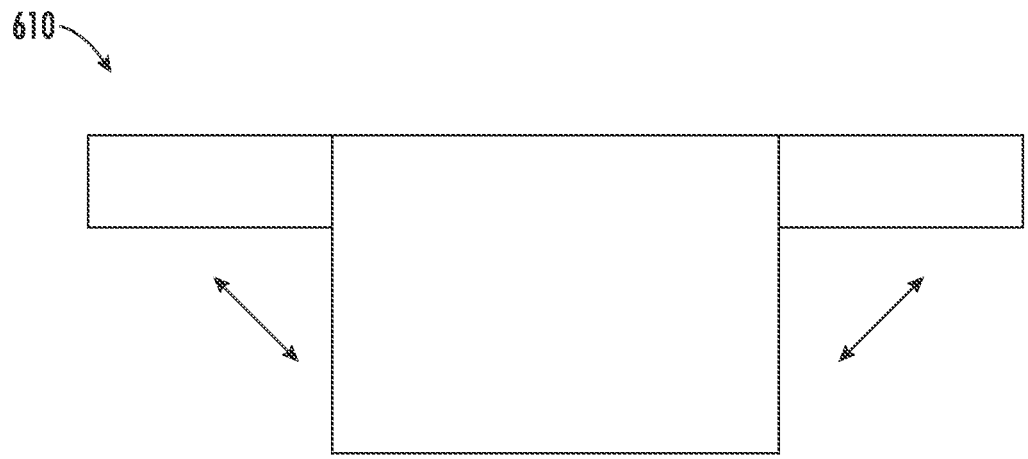
FIG. 35 is a front view of the device of FIG. 33, according to an exemplary embodiment.

After clip 540 and clip 542 are coupled to rail 592 and rail 594, respectively, foldable work platform 510 is moved in direction 526, such as downward. In response to foldable work platform 510 moving in direction 526 with respect to modular storage unit 590, the curved outer surface of cam 522, such as the convex outer surface 524 of cam 522, biases cam 522 to move in direction 528 from the disengaged position to the engaged position until end of cam 522 protrudes against rail 592. Referring to FIG. 32, when cams 522 are actuated into the protruding position, ends of both cams extend around rails to secure foldable work platform 510 to modular storage unit 590.

Referring to FIGS. 33-37, various aspects of a foldable work platform 610 are shown. Foldable work platform 610 is similar to foldable work platform 10, foldable work platform 110, foldable work platform 210, foldable work platform 310, foldable work platform 410 or foldable work platform 510 with the exception of the differences described.

Figure 36:
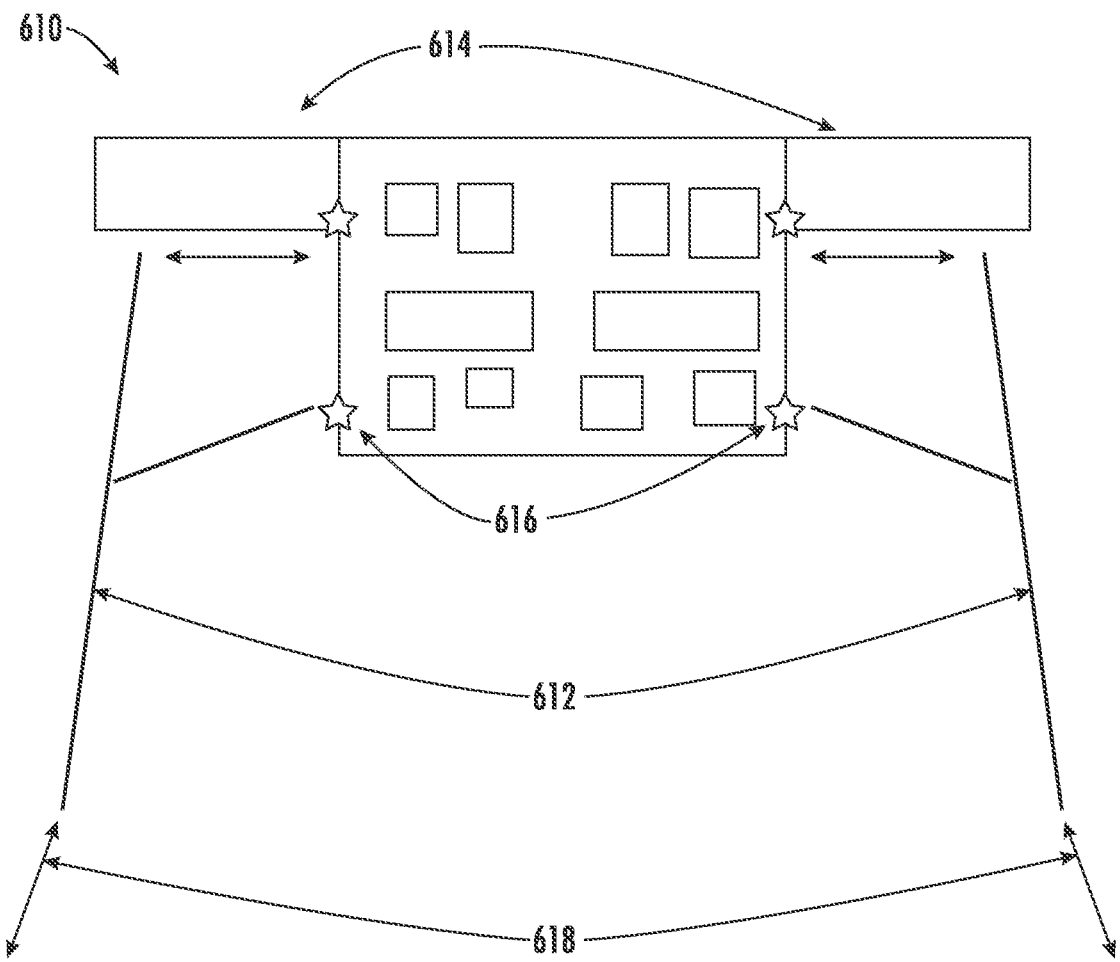
FIG. 36 is a front view of the device of FIG. 33, according to an exemplary embodiment.
Figure 37:
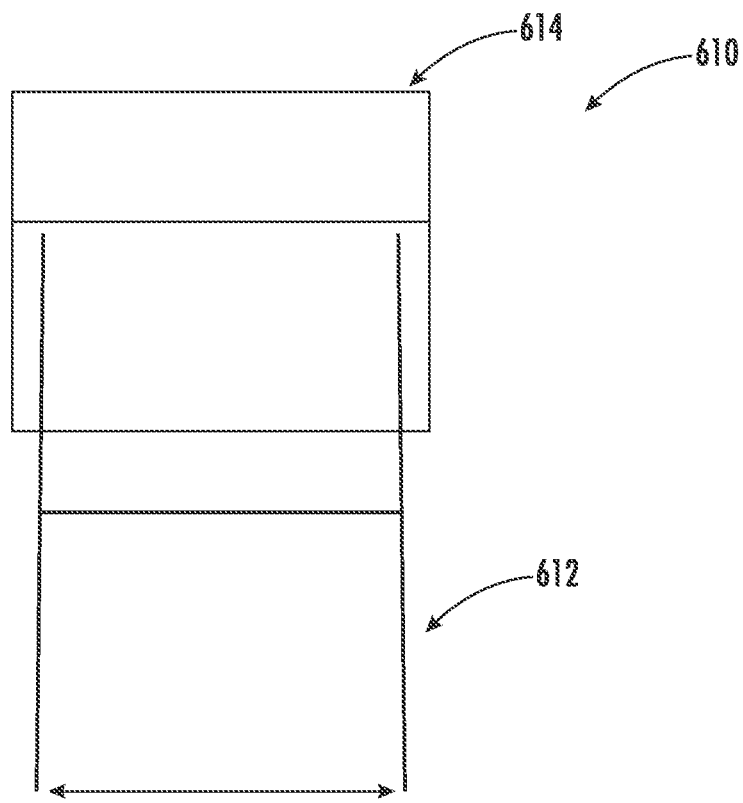
FIG. 37 is a front view of the device of FIG. 33, according to an exemplary embodiment.
Figure 38:
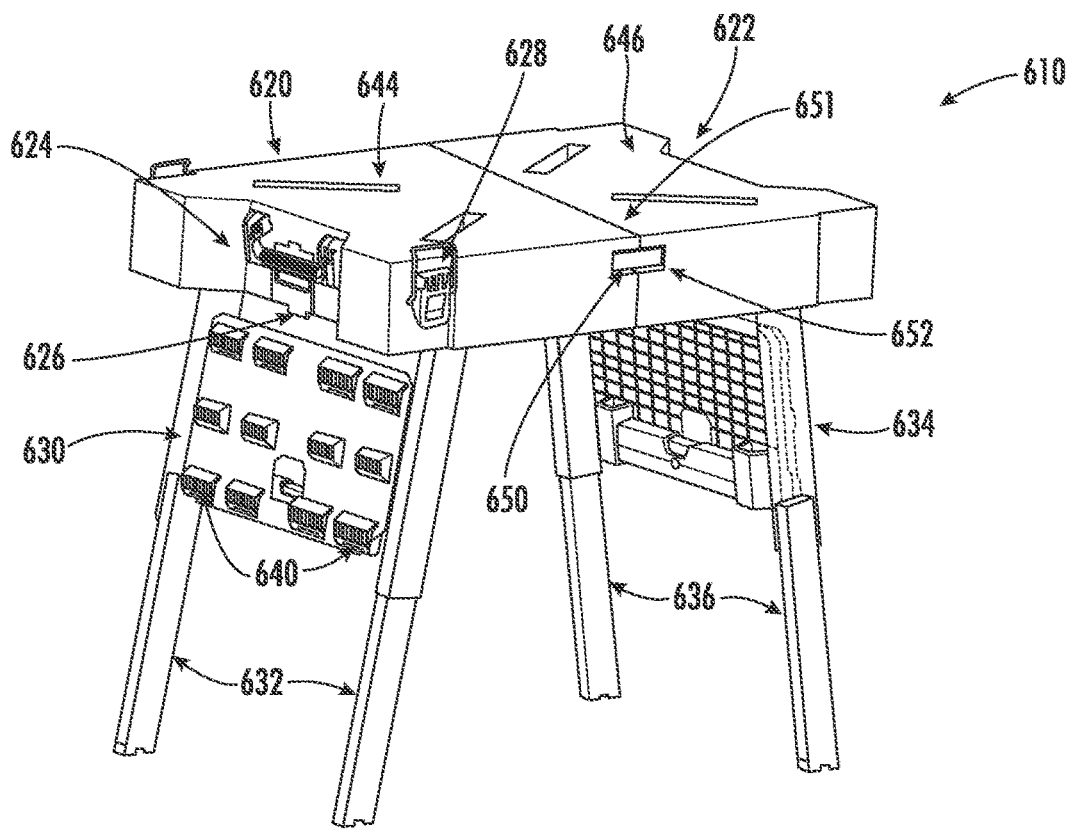
FIG. 38 is a perspective view, from above and in front, of the device of FIG. 33, according to an exemplary embodiment.
Figure 39:
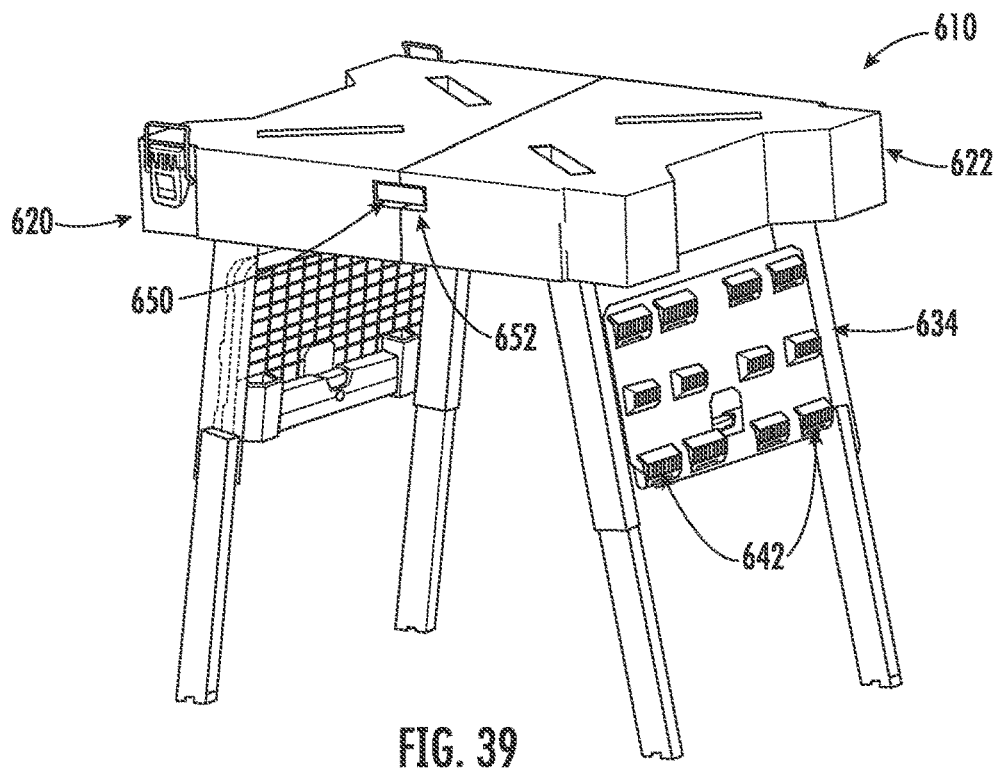
FIG. 39 is a perspective view, from above and in back, of the device of FIG. 33, according to an exemplary embodiment.
Figure 40:
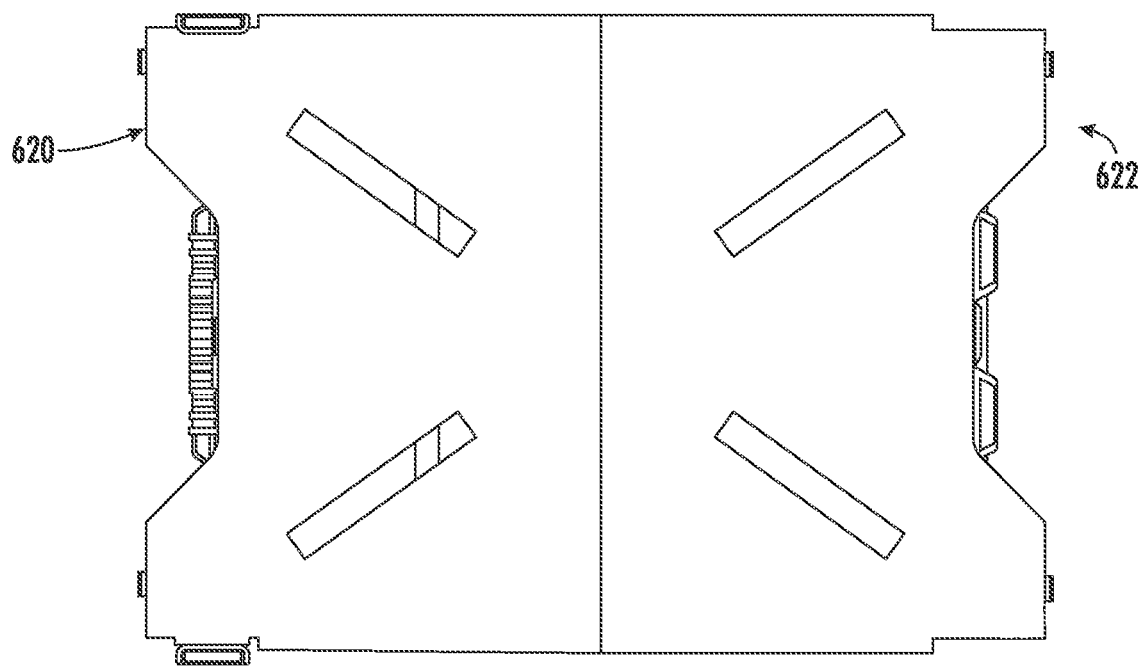
FIG. 40 is a top view of the device of FIG. 33, according to an exemplary embodiment.
Figure 41:
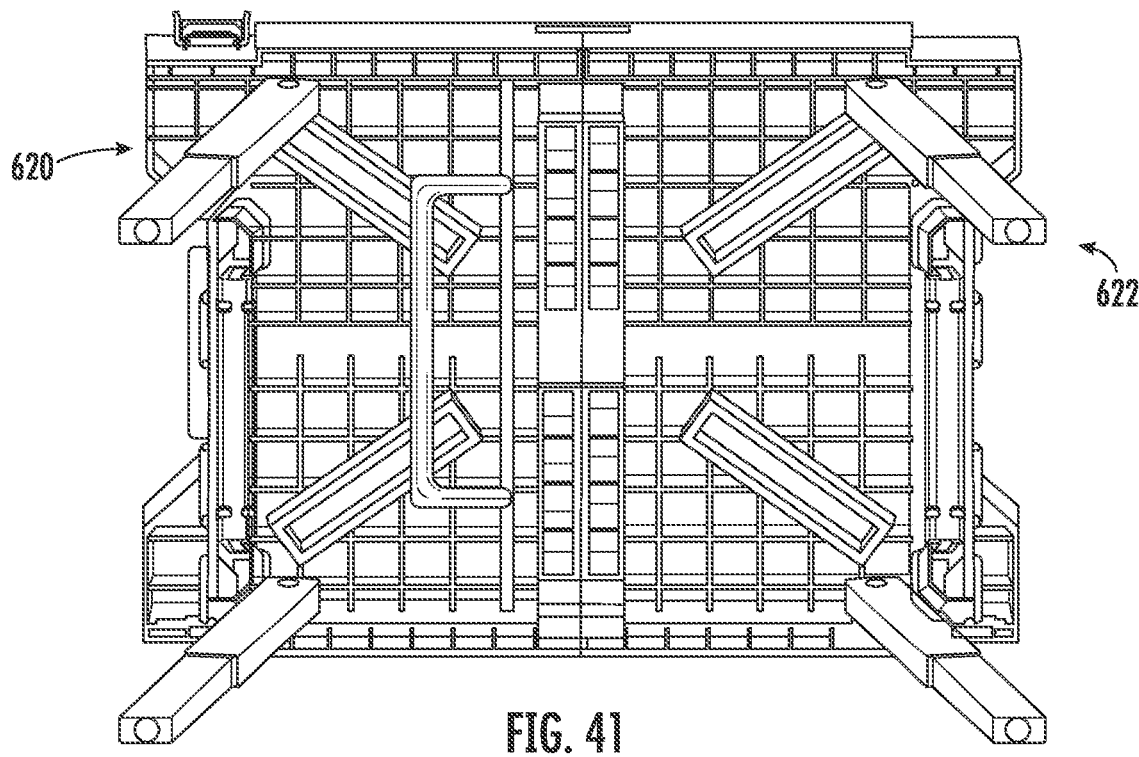
FIG. 41 is a bottom view of the device of FIG. 33, according to an exemplary embodiment.

Referring to FIG. 36, foldable work platform 610 includes support elements, shown as extendable legs 612, that extend and retract along directions 618. When foldable work platform 610 is opened, legs 612 rotate with respect to foldable work platform 610 at pivots 616 and slide with respect to side elements, shown as wings 614. Referring to FIG. 37, extendable legs 612 are positioned on opposing sides (e.g., ends) of foldable work platform 610.

Referring to FIGS. 38-49, various aspects of the foldable work platform 610 are shown. First housing 620 is pivotally coupled to second housing 622 via hinge 651 such that the first housing and the second housing are configured to actuate between an open configuration and a closed configuration. First housing 620 includes upper surface 644, such as a planar work surface, and second housing 622 includes upper surface 646, such as a planar work surface. In a specific embodiment, when foldable work platform 610 is positioned in the open configuration, upper surface 644 of first housing 620 is coplanar with upper surface 646 of second housing 622. In various embodiments, one or more of upper surface 644 and upper surface 646 define planar work surfaces. In various embodiments, first housing 620 is coupled to second housing 622 via hinges that are non-load bearing. To support first housing 620 and second housing 622 in the open configuration, retractable projections 650 extend from first housing 620 into recesses 652 of second housing 622. To toggle first housing 620 and second housing 622 to the closed configuration, retractable projections 650 are retracted from recesses 652 and subsequently second housing 622 can be pivoted with respect to first housing 620. In a specific embodiment, the clamping feature, such as between the first and second housings, is an X pattern and a ridge around the outside that is clamp friendly (e.g., with stiff double ribs).

First support structure, shown as retractable leg 630, is pivotally coupled to first housing 620. Extendable leg 632 is coupled to leg 630 and extends and retracts with respect to leg 630. Second support structure, shown as retractable leg 634, is coupled to second housing 622. Extendable leg 636 is coupled to leg 634 and extends and retracts with respect to leg 634. In various embodiments, support bars between the legs are spring-loaded so the support bars slide out when the legs are unfolded. In various embodiments, the center bar can be rotated 90 degrees so that there is more space above the center bar. In various embodiments, leg 630 and leg 632 are configured to collectively support the first housing 620 and the second housing 622 when the first housing 620 and the second housing 622 are positioned in the open configuration. In various embodiments, leg 630 is configured to actuate between an extended position in which leg 630 extends from the first housing 620 and a retracted position in which leg 630 is at least partially retracted within the first housing 620. Leg 634 is similarly configured to actuate between an extended position in which leg 634 extends from the second housing 622 and a retracted position in which leg 634 is at least partially retracted within the second housing 622.

A first plurality of coupling components 640 are coupled to the leg 630. In various embodiments the first plurality of coupling components 640 are male couplers. The first plurality of coupling components 640 are configured to couple the foldable work platform 610 to a first surface of a stackable storage unit (e.g., stackable storage unit 590). A second plurality of coupling components 642 are coupled to the leg 634, the second plurality of coupling components 642 are configured to couple the foldable work platform 610 to the same first surface of the stackable storage unit (e.g., stackable storage unit 590).

Handle 624 is coupled to a front of foldable work platform 610 when foldable work platform 610 is in the open configuration. Central latch 626 is slidably coupled to a front of first housing 620. In use, central latch 626 engages with an aperture in an upper surface of another modular unit when foldable work platform 610 is coupled to a top of the modular unit. For example, latch 626 is configured to engage with a stackable storage unit and thereby prevent sliding disengagement of the foldable work platform 610 from the stackable storage unit when the first plurality of coupling components 640 are engaged with a third plurality of coupling components of the stackable storage unit.

Figures 42, 43, 44:
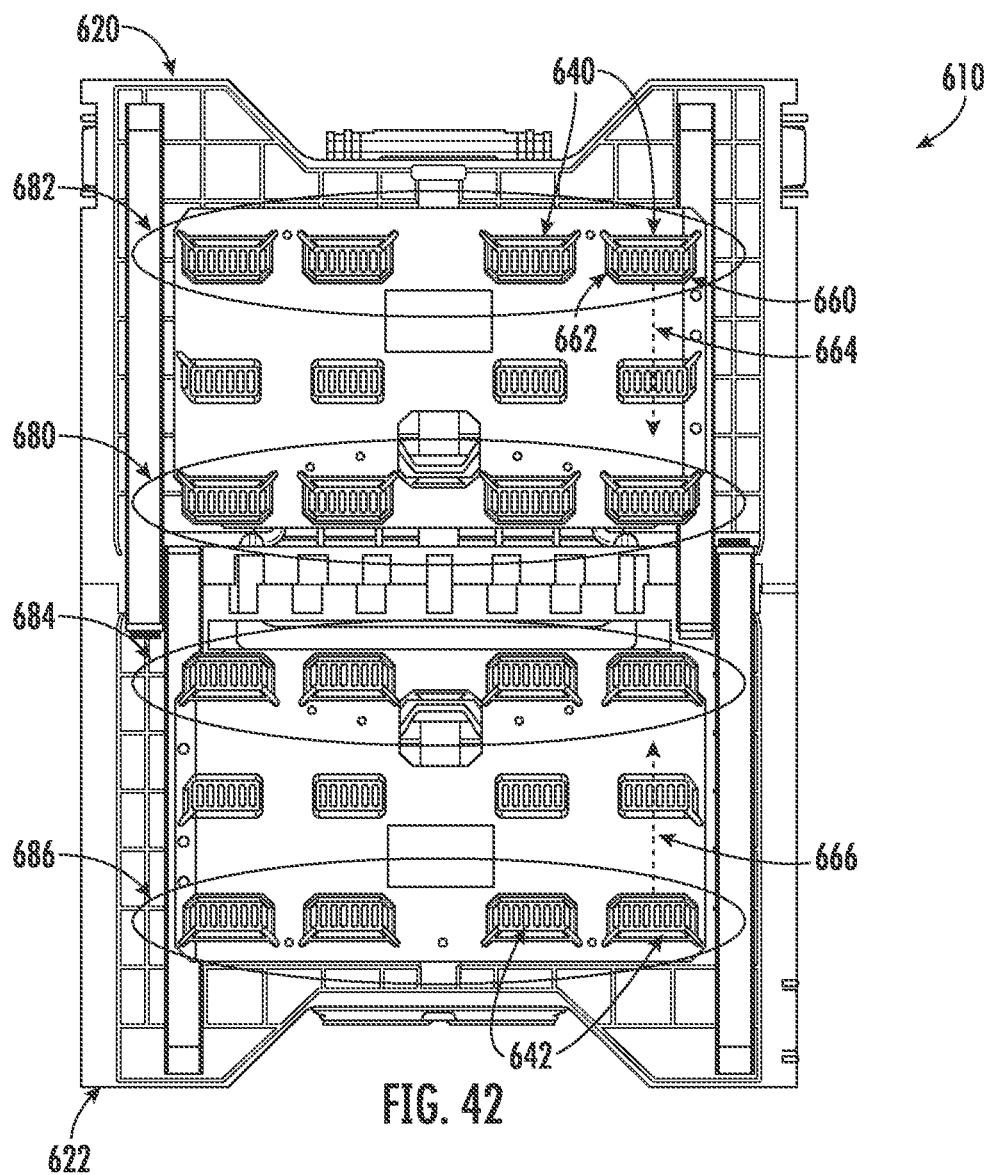
FIG. 42 is a bottom view of the device of FIG. 33 with the legs in the folded position, according to an exemplary embodiment.
FIG. 43 is a detailed bottom view of the device of FIG. 33 with the legs in the folded position, according to an exemplary embodiment.
FIG. 44 is a detailed perspective view of the device of FIG. 33 of the portion identified in FIG. 43, according to an exemplary embodiment.
Figure 44:
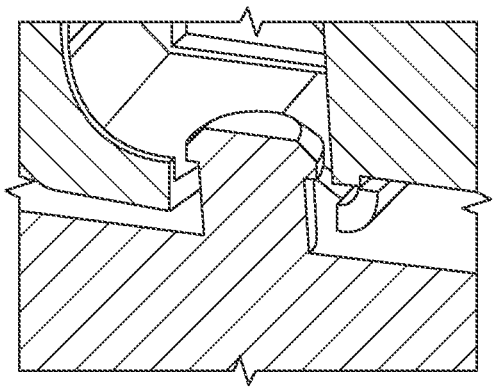

Referring to FIG. 42, in various embodiments, the coupling components 640 of the first plurality of coupling components 640 include a first tongue 660 and an opposing second tongue 662, each extending in a first direction 664. Similarly, the coupling components 642 of the plurality of coupling components 642 include a first tongue and an opposing second tongue each extending in a second direction 666. In various embodiments, first direction 664 and second direction 666 are opposite each other when leg 630 and leg 634 are each in the retracted position and the first housing 620 and the second housing 622 are in the open configuration (FIG. 42).

In various embodiments, the first plurality of coupling components 640 include a first front row 680 of at least two coupling components 640 and a first rear row 682 of at least two coupling components 640 parallel to the first front row 680. The second plurality of coupling components 642 include a second front row 684 of at least two coupling components 642 and a second rear row 686 of at least two coupling components 642 parallel to the second front row 684.

Referring to FIGS. 42-44, in various embodiments leg 634, and leg 636 can be adjusted to the following lengths: 36", 32", 28", and 24". In various embodiments, a rubber friction ring frictionally engages the legs 630, 632 when the legs are in the folded positions. In various embodiments, a cross bar extends between pairs of legs to strengthen the respective legs from being bent. In various embodiments, an insert, such as a metal post insert, grabs the handle 624.

Figure 45:
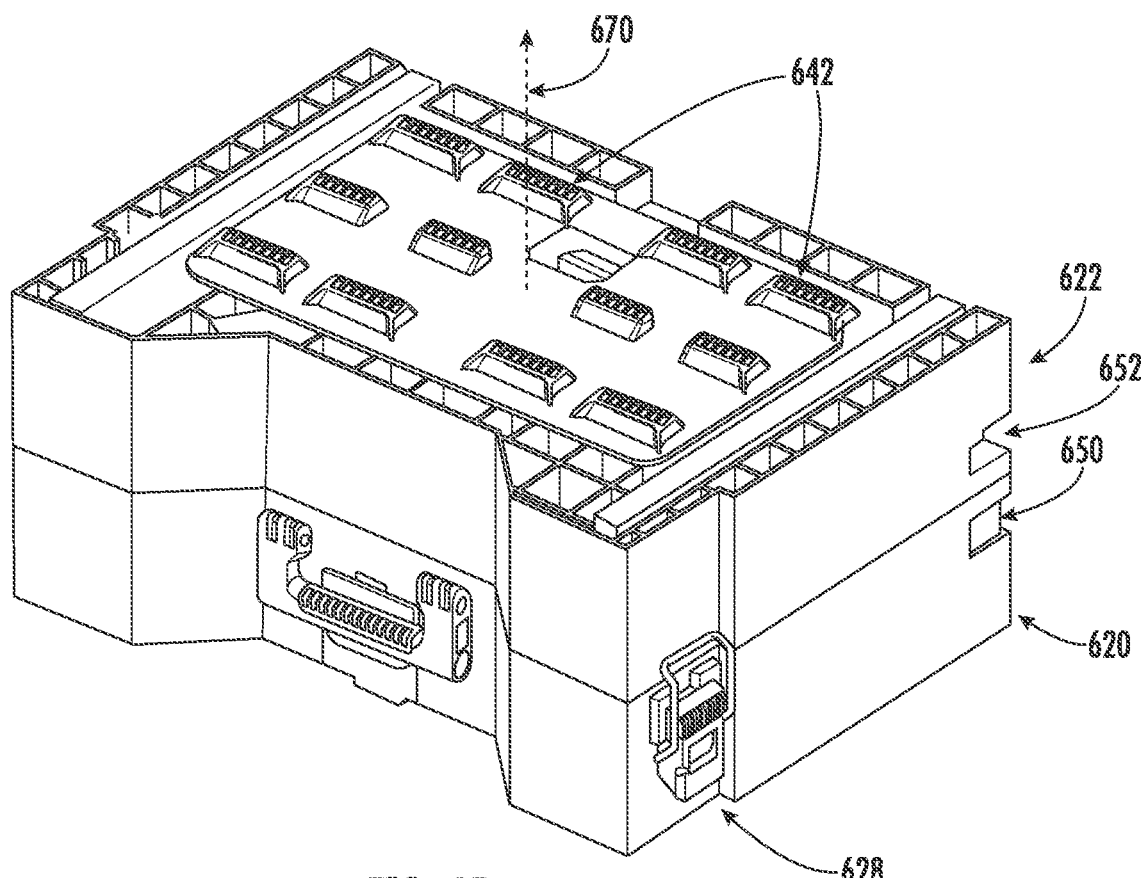
FIG. 45 is a perspective view from above of the device of FIG. 33 in a collapsed configuration, according to an exemplary embodiment.
Figure 46:
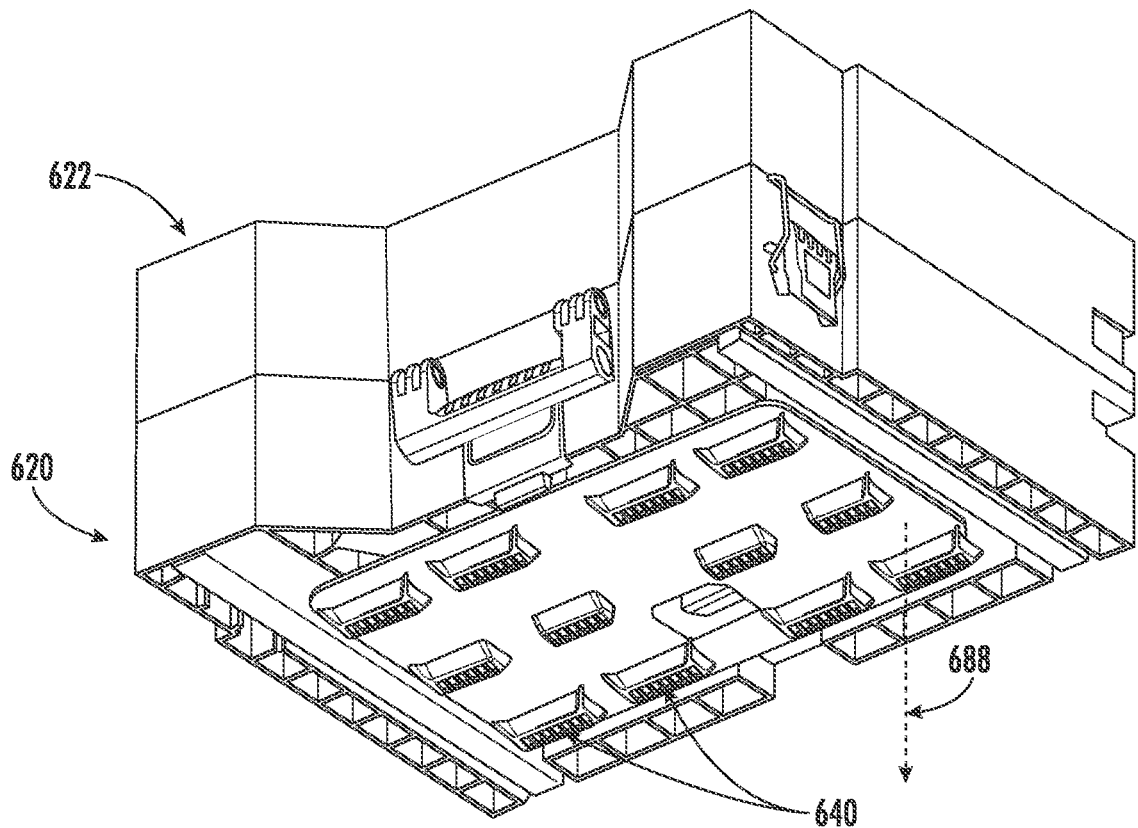
FIG. 46 is a perspective view, from below and in front, of the device of FIG. 33 in a collapsed configuration, according to an exemplary embodiment.
Figure 47:
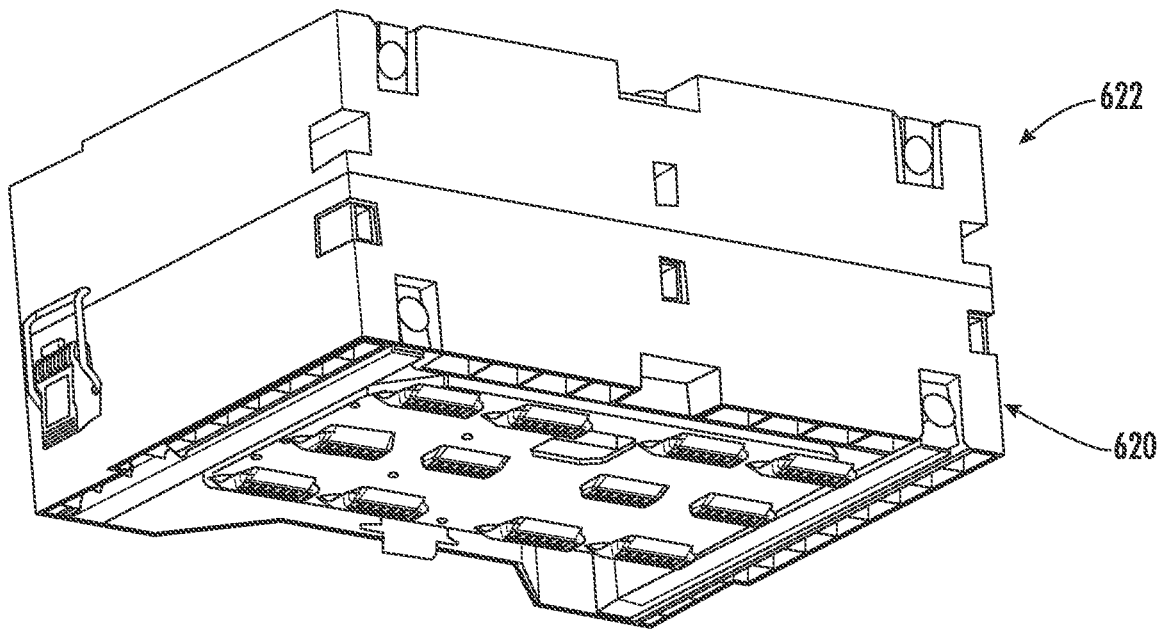
FIG. 47 is a perspective view, from above and in back, of the device of FIG. 33 in a collapsed configuration, according to an exemplary embodiment.

Referring to FIGS. 45-47, in various embodiments, the first direction 664 and second direction 666 extend in the same direction parallel to each other when leg 630 and leg 634 are each in the retracted position and the first housing 620 and the second housing 622 are in the closed configuration (FIGS. 45-47). In various embodiments, the first plurality of coupling components 640 and the second plurality of coupling components 642 face away from each other when the first housing 620 and the second housing 622 are in the closed configuration (FIGS. 45-47). In various embodiments, first plurality of coupling components 640 extend from first housing 620 in direction 668 and second plurality of coupling components 642 extend from second housing 622 in direction 670, and direction 668 is opposite direction 670 when first housing 620 and second housing 622 are coupled together in the closed configuration.

Referring to FIGS. 45-47, side latches 628 are slideably coupled to first housing 620. In various embodiments, latch 628 is configured to couple the first housing 620 to the second housing 622 when the first housing 620 and the second housing 622 are in the closed configuration. When foldable work platform 610 is positioned in the collapsed configuration, side latches 628 engage with second housing 622 to secure foldable work platform 610 in the collapsed configuration (e.g., to secure second housing 622 against first housing 620). While in the collapsed configuration, first plurality of coupling components 640 extend from an upper surface of second housing 622 and engage with a modular unit, such as a modular tool storage unit, that is coupled to a top of foldable work platform 610. Second plurality of coupling components 642 extend from a lower surface of first housing 620 and engage with a modular unit beneath the foldable work platform 610.

Referring to FIGS. 48-49, exemplary measurements of foldable work platform 610 are provided. FIG. 48 depicts a schematic of foldable work platform 610 identifying various segments of foldable work platform 610, and FIG. 49 depicts measurements of the various segments identified in FIG. 48.

Referring to FIGS. 50-56, various aspects of a foldable work platform 710 are shown. Foldable work platform 710 is similar to foldable work platform 10, foldable work platform 110, foldable work platform 210, foldable work platform 310, foldable work platform 410, foldable work platform 510 or foldable work platform 610 with the exception of the differences described.

Foldable work platform 710 includes frame 720. In various embodiments frame 720 includes a receiving element, shown as aperture 722, configured to receive a work platform, shown as removeable plate 724. Removeable plate 724 includes an upper surface 726 and an opposing lower surface 728. In various embodiments, removeable plate 724 is reversible within aperture 722 and/or interchangeable with other removeable plates. In this way, people using foldable work platform 710 can select a removeable plate to couple to frame 720 that is customized for the tasks they are intending to perform (e.g., upper surface 726 of removeable plate 724 may define a planar or mostly planar work surface).

Figure 50:
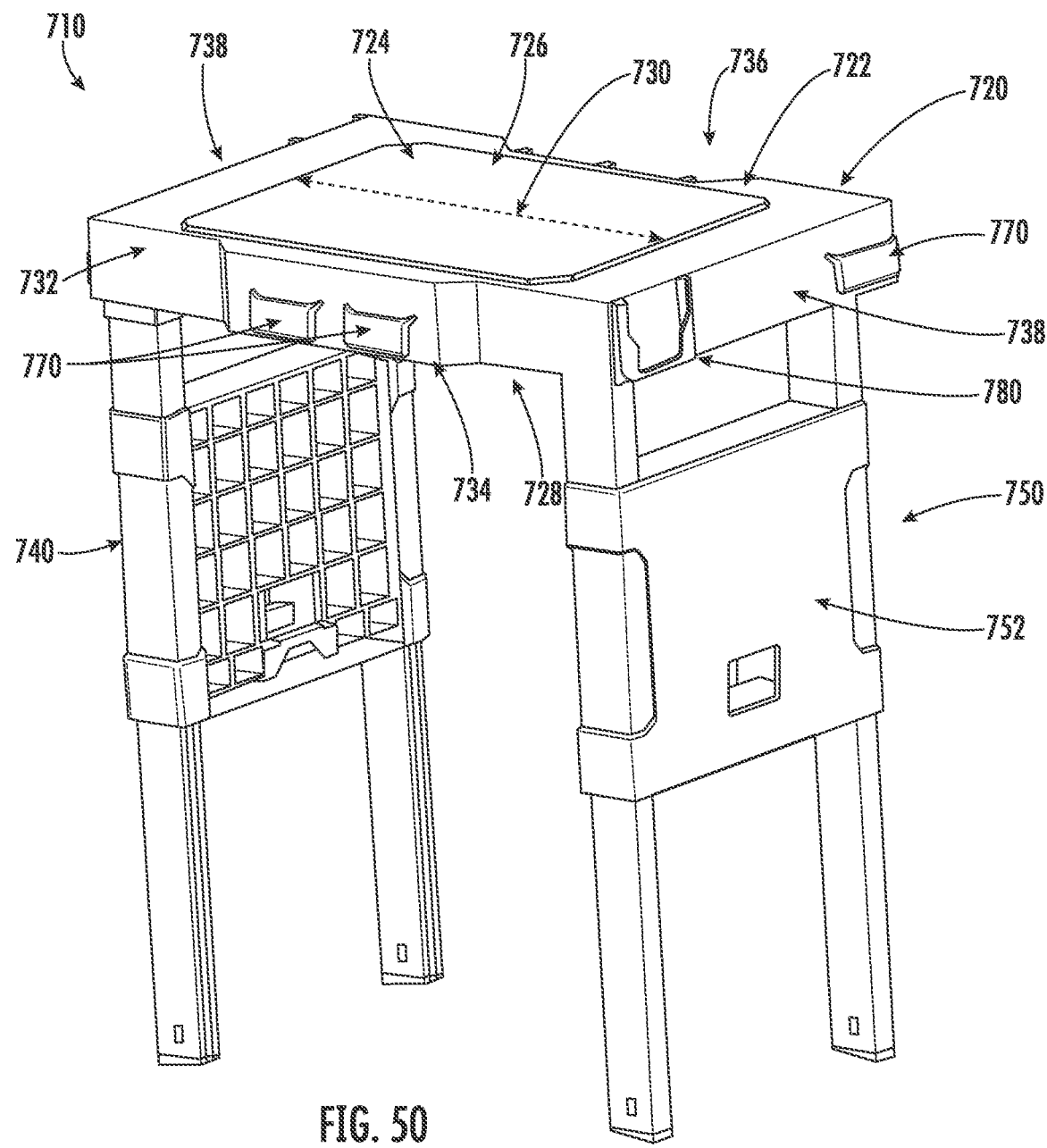
FIG. 50 is a perspective view from above of a device including a work surface, according to another exemplary embodiment.
Figure 51:
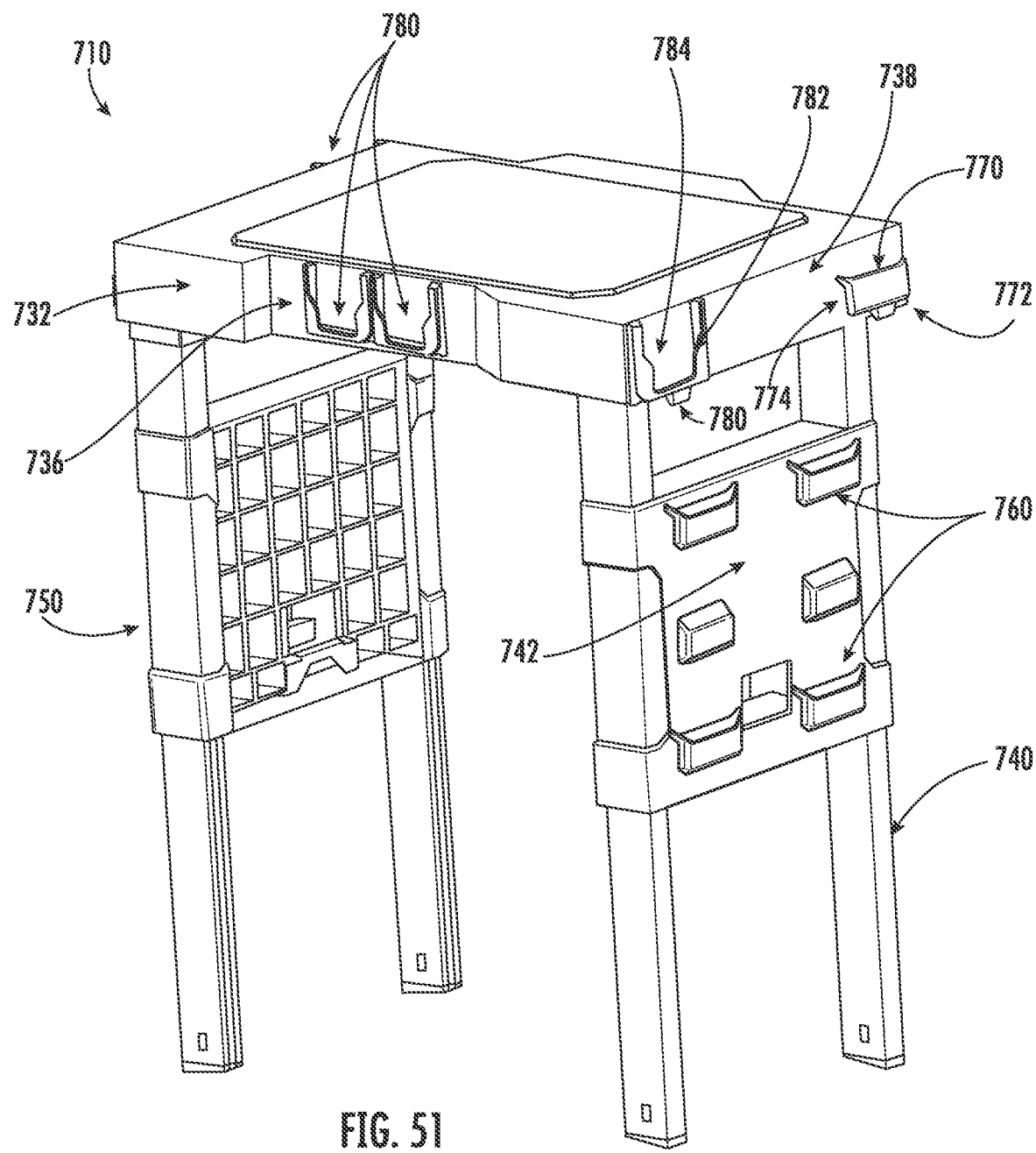
FIG. 51 is a perspective view of the device of FIG. 50 shown from behind, according to an exemplary embodiment.
Figure 52:
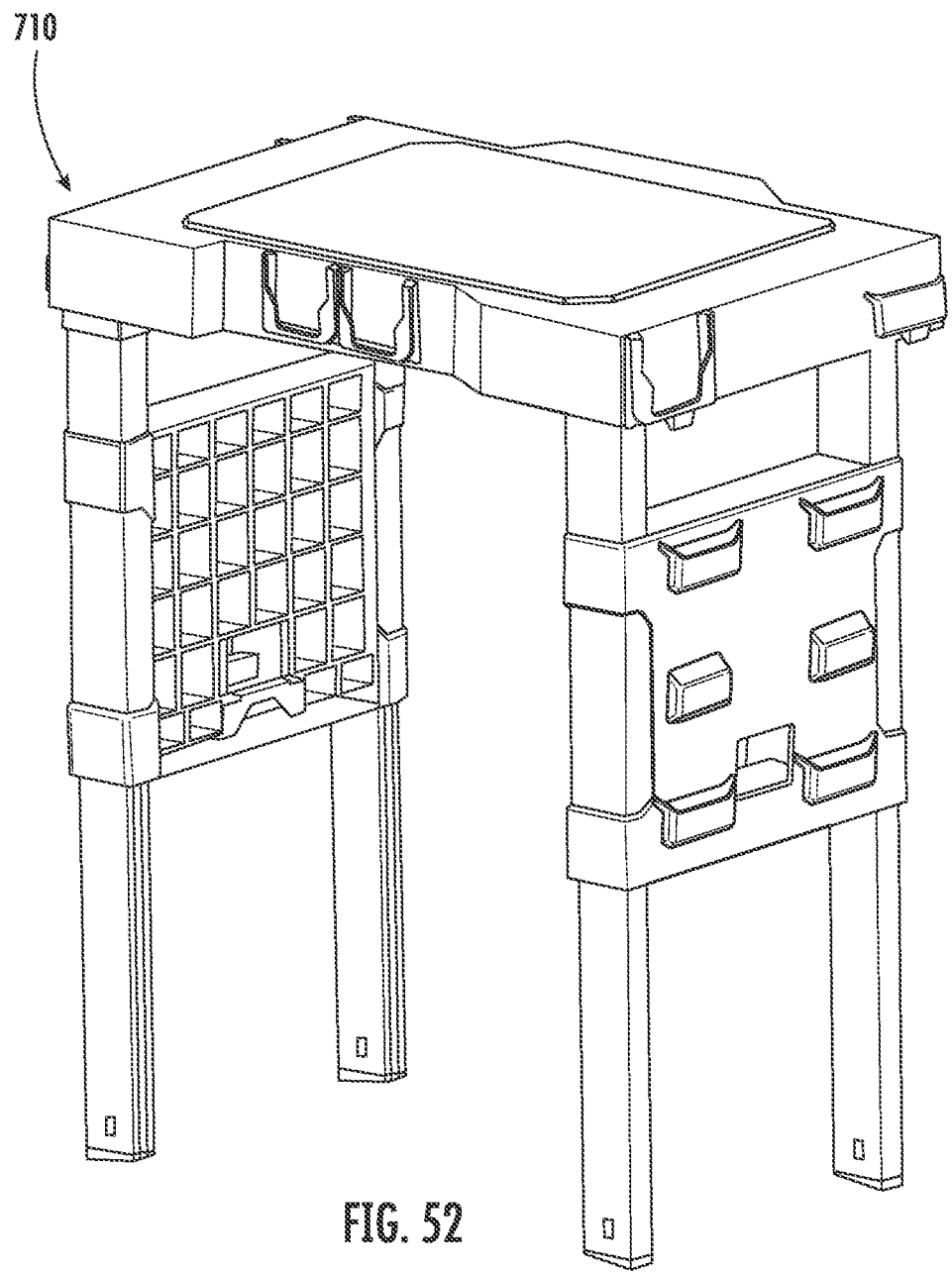
FIG. 52 is a perspective view of the device of FIG. 50, according to an exemplary embodiment.
Figure 53:
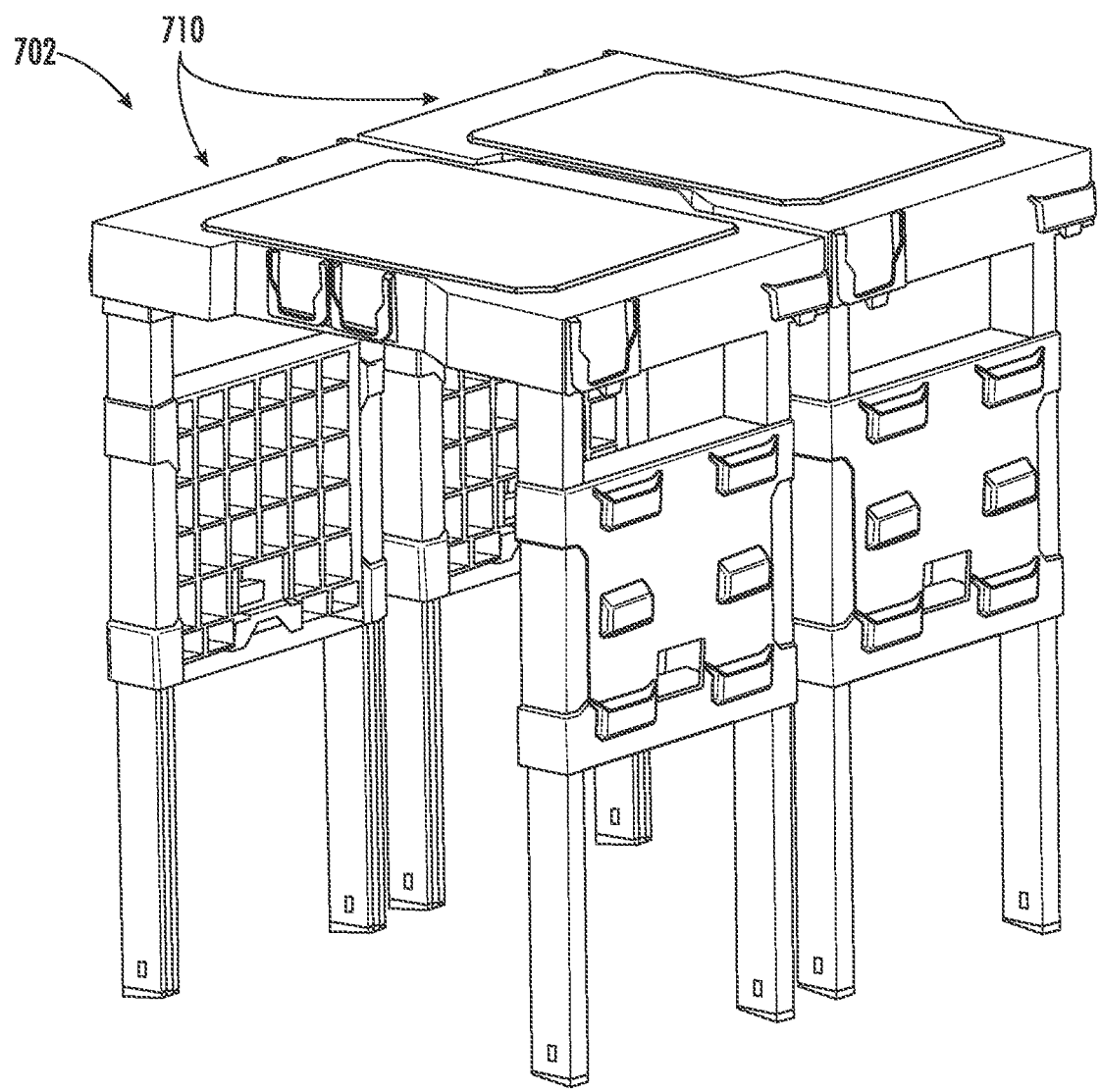
FIG. 53 is a perspective view of two of the devices of FIG. 50 positioned next to each other, according to an exemplary embodiment.

Referring to FIGS. 50-51, in various embodiments frame 720 extends along a longitudinal axis 730. Frame 720 includes lateral surfaces 732 extending along either side of longitudinal axis 730, and end surfaces 738 at opposing ends of frame 720 along longitudinal axis 730. One of lateral surfaces 732 includes a projection 734 that extends outward from frame 720, and the opposing lateral surface 732 includes a recess 736 configured to receive projection 734. In various embodiment, coupling components, shown as male couplers 770, are coupled to projection 734, and other coupling components, shown as female couplers 780, are coupled within recess 736.

In this manner, when a first foldable work platform 710 is coupled to a second foldable work platform 710, the projection 734 of the first foldable work platform 710 is received within recess 736 of the second foldable work platform 710. Further, the male couplers 770 of the first foldable work platform 710 are detachably engaged with the female couplers 780 of the second foldable work platform 710, such as by sliding first foldable work platform 710 vertically with respect to the second foldable work platform 710.

In various embodiments, one or more male couplers 770 and one or more female couplers 780 are coupled to a periphery of frame 720. As will be demonstrated, male couplers 770 and female couplers 780 are arranged around frame 720 to facilitate coupling foldable work platform 710 to one or more other foldable work platforms 710. In particular, foldable work platforms 710 are coupled together via male couplers 770 and/or female couplers 780 of a first foldable work platform 710 engaging with female couplers 780 and/or male couplers 770, respectively, of a second foldable work platform 710.

In various embodiments, male couplers 770 include first rib 772 and second rib 774, the first rib 772 and second rib 774 extending away from each other offset from the frame 720. In various embodiments, female couplers 780 include first tongue 782 and second tongue 784, each of the first tongue 782 and the second tongue 784 extending parallel to each other on opposing sides of female coupler 780 offset from the frame 720 (FIG. 51).

First support structure, shown as first leg 740, and second support structure, shown as second leg 750, are each pivotally coupled to frame 720 and are each configured to support the frame 720. First leg 740 includes a first coupling platform, shown as plate 742. In various embodiments, plate 742 includes a plurality of male couplers 760 extending outward from plate 742. Second leg 750 includes a second platform, shown as plate 752. As will be explained in more detail below, in various embodiments second leg 750 folds under first leg 740. For at least this reason, in various embodiments the outer surface of plate 752 defines a flat surface.

Figure 54:
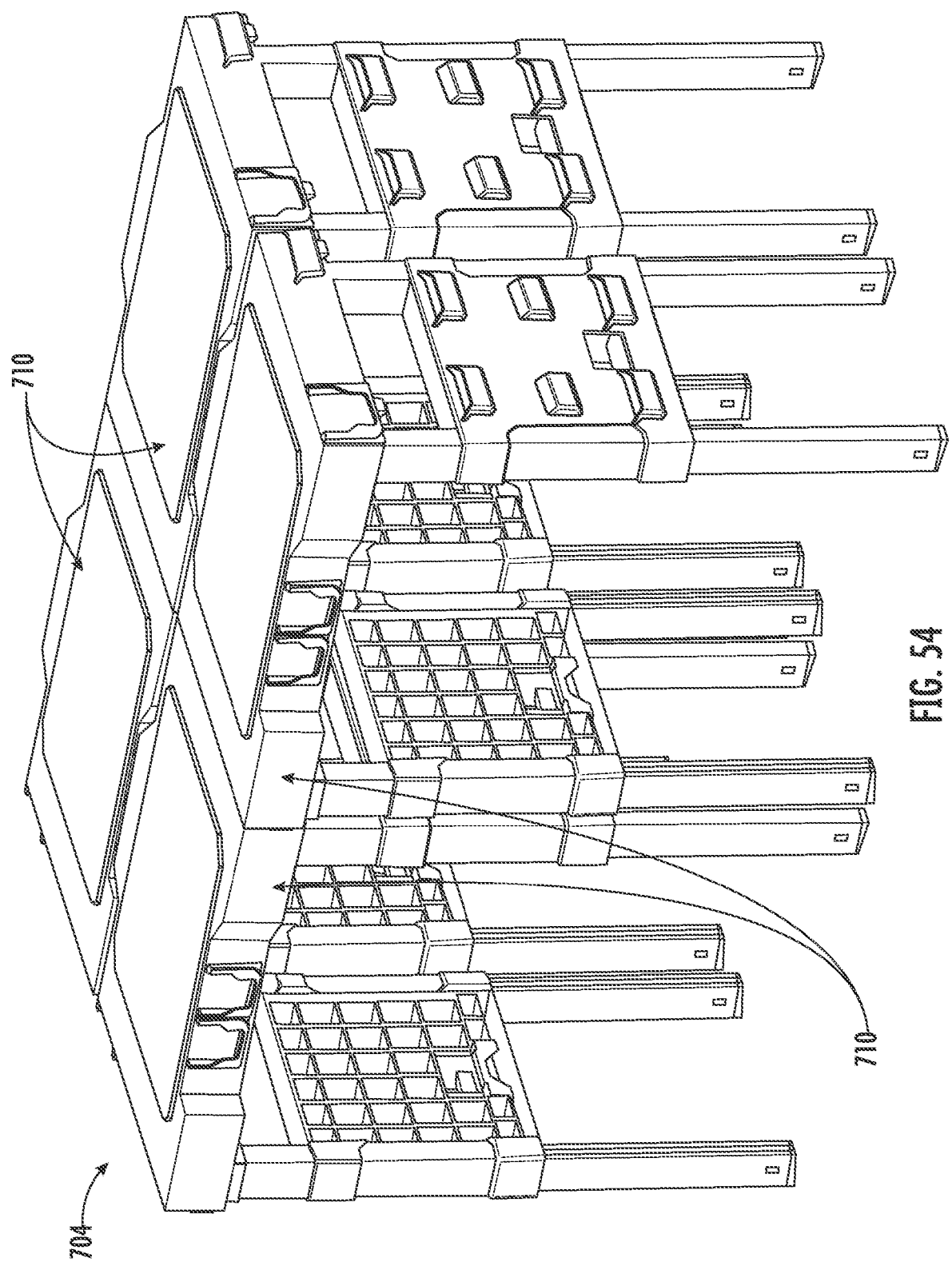
FIG. 54 is a perspective view of four of the devices of FIG. 50 positioned next to each other in a grid, according to an exemplary embodiment.
Figure 55:
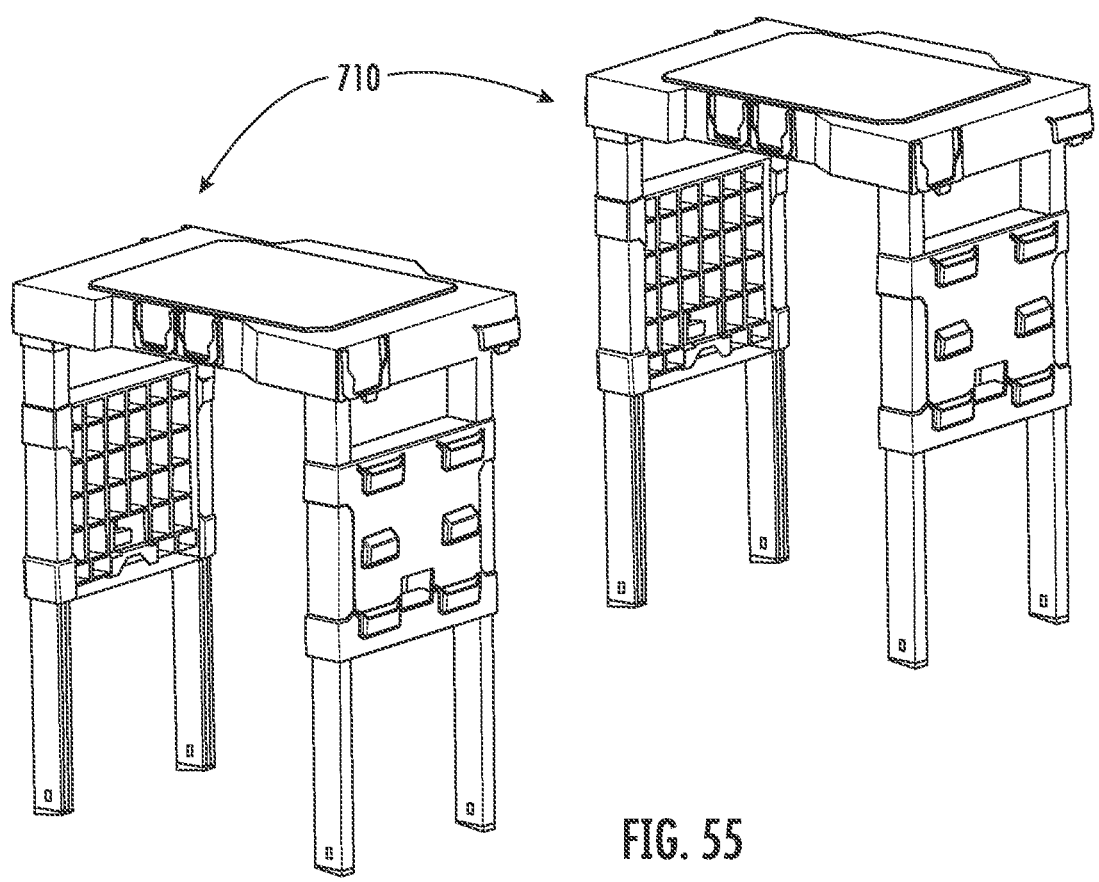
FIG. 55 is a perspective view of two of the devices of FIG. 50 spaced apart from each other, according to an exemplary embodiment.
Figure 56:
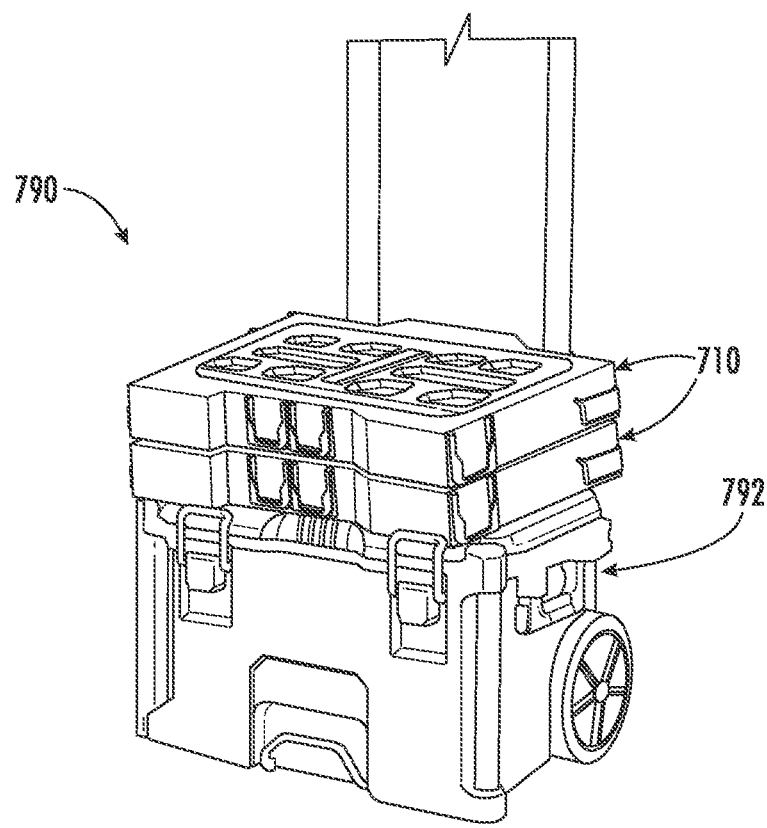
FIG. 56 is a perspective view of two of the devices of FIG. 50 shown coupled to a modular unit, according to an exemplary embodiment.

In various embodiments, foldable work platform 710 is configured such that multiple foldable work platforms 710 can be placed next to each other (e.g., such as via linking foldable work platforms 710) to form a larger work surface. For example, multiple instances of foldable work platform 710 may be coupled together to form a larger work surface. In this way, a very strong yet portable work table system can be constructed and deconstructed very easily. In various embodiments, platform system 702 includes two foldable work platforms 710 coupled to each other (side-by-side) to provide a larger continuous surface than would be provided by a single foldable work platform 710 (FIG. 53), and platform system 704 includes four foldable work platforms 710 coupled to each other in a grid arrangement, e.g., 2×2 (FIG. 54). In one exemplary use case, multiple foldable work platforms 710 are spread apart and one or more objects (e.g., 2×4 pieces of wood) are extended between the foldable work platform 710 to provide a support structure (FIG. 55). In various embodiments, to move foldable work platforms 710 the legs of the foldable work platforms 710 are folded into the upper frame and then one or more of foldable work platforms 710 are coupled to a modular unit 792 to form a modular system 790 including the modular unit 792 with wheels and one or more foldable work platforms 710 (FIG. 56).

In various embodiments, foldable work platform 710 includes an interchangeable and/or reverseable top within the upper frame, the top permitting users to create custom support structures (e.g., tables) for specific tasks. In various embodiments, setup of foldable work platform 710 is simpler because there is no unfolding and locking, such as via quick release legs. In various embodiments, foldable work platform 710 is configured to collectively support objects thereby the total supportable weight to be larger than provided by a single foldable work platforms 710. In various embodiments, foldable work platform 710 includes coupling components compatible with the coupling mechanism(s) described in International Patent Application No. PCT/US2018/044629.

In various embodiments, foldable work platform 710 has a 36" height. In various embodiments, upper frame and top define a working upper surface of approximately 16"×24".

Figure 57:
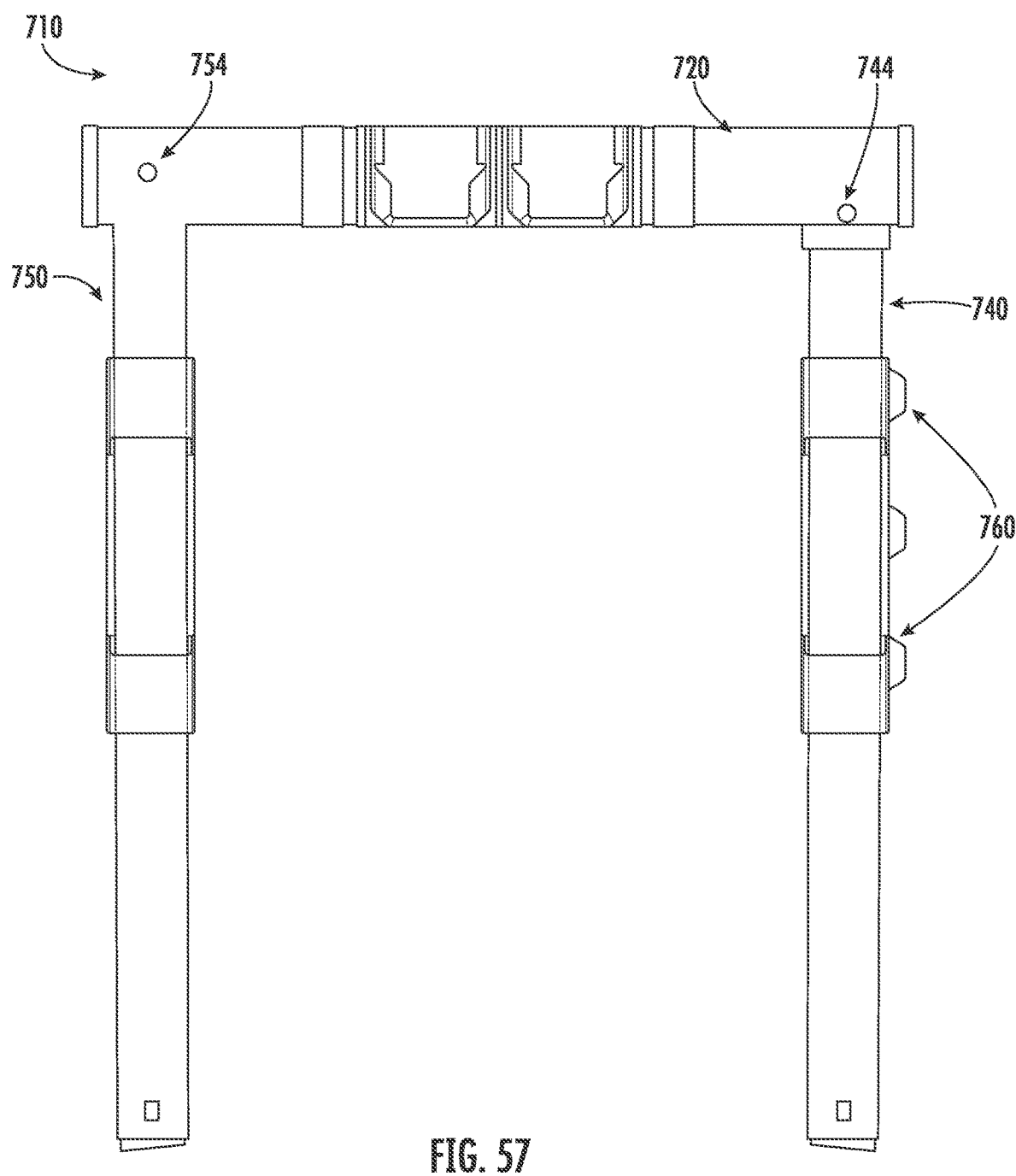
FIG. 57 is a cross-section view of the device of FIG. 50, according to an exemplary embodiment.

Referring to FIG. 57, first leg 740 is pivotally coupled to frame 720 and pivots with respect to frame 720 about axis 744. Second leg 750 is pivotally coupled to frame 720 and pivots with respect to frame 720 about axis 754. In various embodiments axis 754 is above axis 744, thereby facilitating first leg 740 restricting rotation of second leg 750 (e.g., holding in second leg 750) when foldable work platform 710 is in the closed configuration.

Referring to FIGS. 58-64, various aspects of a foldable work platform 810 are shown. Foldable work platform 810 is similar to foldable work platform 10, foldable work platform 110, foldable work platform 210, foldable work platform 310, foldable work platform 410, foldable work platform 510, foldable work platform 610 or foldable work platform 710 with the exception of the differences described.

Figure 58:
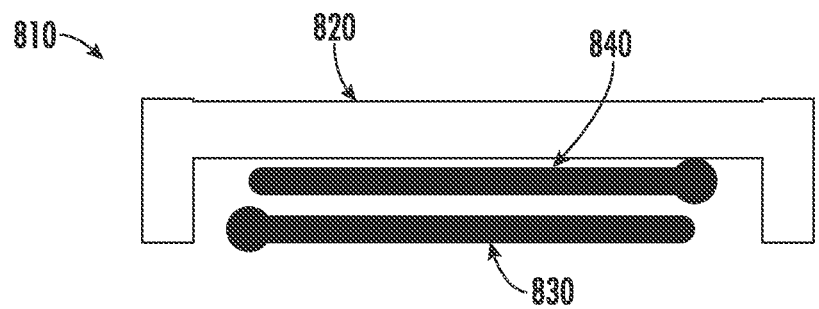
FIG. 58 is a schematic cross-section view of a foldable device including a work surface, according to an exemplary embodiment.
Figure 59:
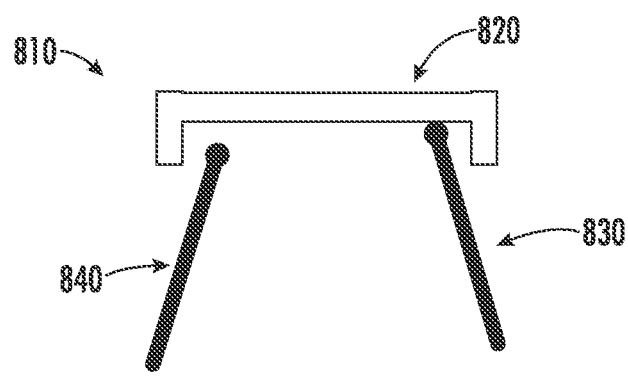
FIG. 59 is a schematic cross-section view of the device of FIG. 58, according to an exemplary embodiment.

Referring to FIG. 58-59, in various embodiments second leg 840 of foldable work platform 810 folds above first leg 830 when foldable work platform 810 is arranged in the folded configuration. In various embodiments, when pivoted open from frame 820 first leg 830 and second leg 840 extend from frame 820 at an angle between 8 degrees and 10 degrees. In various embodiments, the legs have a cross-sectional dimension of 2×1.25 inches or a 2" circle.

Figure 60:
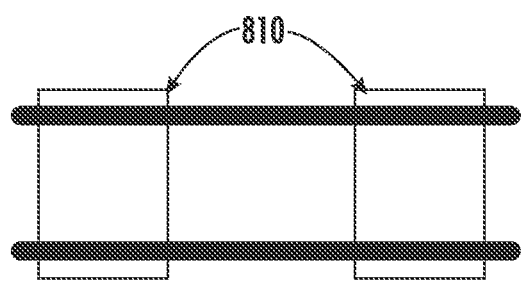
FIG. 60 is a schematic top view of two devices of FIG. 58, according to an exemplary embodiment.
Figure 61:
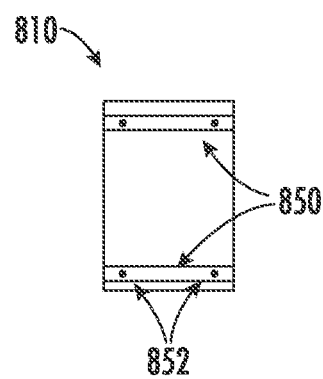
FIG. 61 is a schematic top view of the device of FIG. 58, according to an exemplary embodiment.

Referring to FIGS. 60-61, in various embodiments foldable work platform 810 is configured to support structures between neighboring foldable work platforms 810. For example, foldable work platforms 810 are configured to support beams, such as 2×4 boards, that extend between foldable work platforms 810. In various embodiments, foldable work platform 810 includes a recess, shown as detent 850, configure to receive 2×4 boards, and the detents include one or more coupling apertures, shown as screw holes 852.

Figure 62:
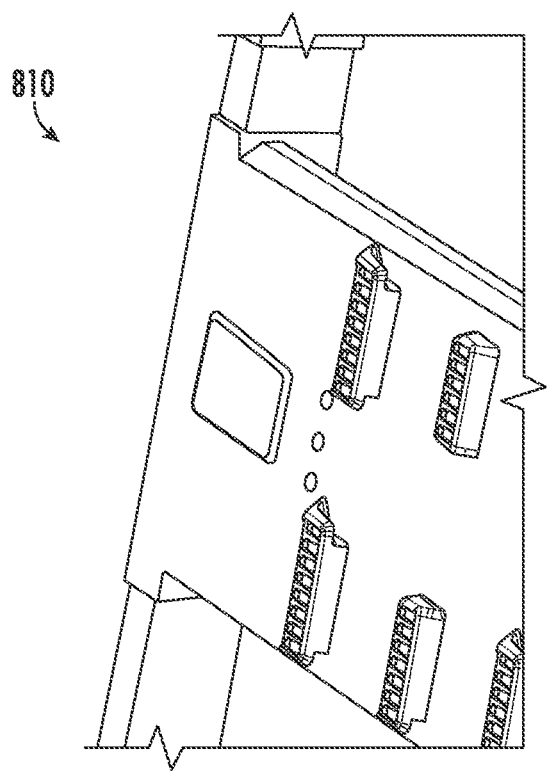
FIG. 62 is a perspective view of a portion of the device of FIG. 58, according to an exemplary embodiment.
Figure 63:
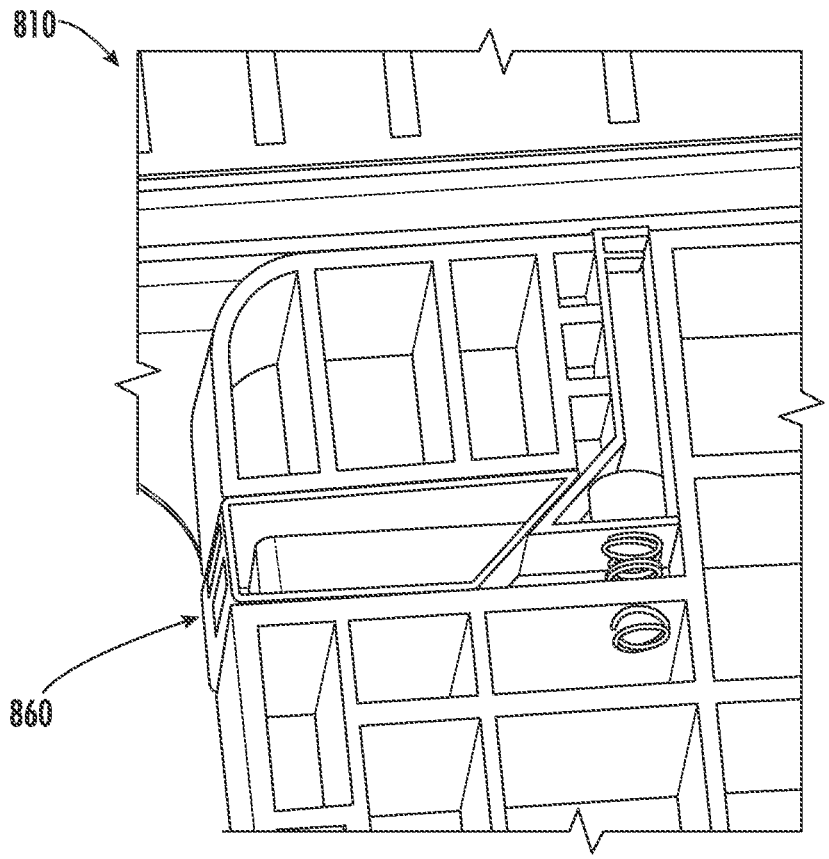
FIG. 63 is a perspective view of a portion of the device of FIG. 58, according to an exemplary embodiment.
Figure 64:
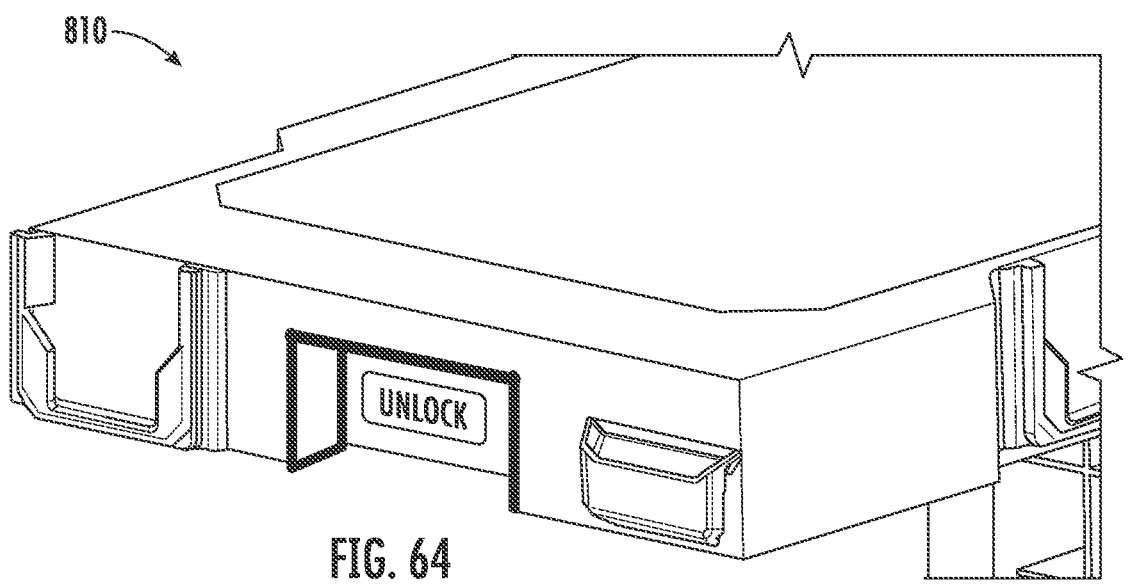
FIG. 64 is a perspective view of a portion of the device of FIG. 58, according to an exemplary embodiment.

Referring to FIG. 62, in various embodiments the coupling mechanisms are in the table top and/or a leg plate. Referring to FIGS. 63-64, in various embodiments foldable work platform 810 includes an inlaid handle on both sides for grabbing foldable work platform 810 off a stack, such as a stack of foldable work platforms 810. In various embodiments, foldable work platform 810 includes a push button lock on the side of the lower leg (e.g., first leg 830) that includes a cam interface 860 (FIG. 63).

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the disclosure relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

What is claimed is:

1. A foldable work platform configured to couple to a modular storage unit, the foldable work platform comprising:
    a housing comprising a work surface, the housing extending along a longitudinal axis between a first lateral side and an opposing second lateral side;
    a first support structure pivotally coupled to the housing;
    a second support structure pivotally coupled to the housing, the first support structure and the second support structure configured to collectively support the housing;
    a first clip extending from the first lateral side of the housing, the first clip configured to detachably couple the foldable work platform to a first vertical rail extending from a modular storage unit, the first clip comprising a cam pivotally coupled to the housing, the cam actuating between an engaged position and a disengaged position with respect to the first vertical rail, wherein the cam is in the engaged position when the first clip is coupled to the first vertical rail; and
    a second clip extending from the second lateral side of the housing, the second clip configured to detachably couple the foldable work platform to a second vertical rail, distinct from the first vertical rail, the second vertical rail extending from the modular storage unit.

2. The foldable work platform of claim 1, wherein the longitudinal axis extends vertically when the first clip and the second clip are coupled to the first vertical rail and second vertical rail, respectively.

3. The foldable work platform of claim 1, wherein the work surface comprises a planar surface.

4. The foldable work platform of claim 1, comprising a third clip extending from the first lateral side of the housing, the third clip configured to detachably couple the foldable work platform to the first vertical rail, wherein the third clip is positioned above the first clip when the first clip and the third clip are coupled to the first vertical rail.

5. The foldable work platform of claim 4, comprising a fourth clip extending from the second lateral side of the housing, the fourth clip configured to detachably couple the foldable work platform to the second vertical rail, wherein the fourth clip is positioned above the second clip when the fourth clip and the second clip are coupled to the second vertical rail.

6. The foldable work platform of claim 1, the cam including a curved outer surface that biases the cam from the disengaged position to the engaged position in response to the foldable work platform moving in a first direction with respect to the modular storage unit.

7. The foldable work platform of claim 6, wherein the first direction is downward.

8. The foldable work platform of claim 1, the first support structure and the second support structure are configured to actuate between an extended position in which the first support structure and the second support structure extend from the housing and a retracted position in which each of the first support structure and the second support structure are at least partially retracted within the housing.

9. The foldable work platform of claim 8, comprising a lower wall slidably coupled to the housing, wherein the lower wall slides in response to the first support structure and the second support structure actuating from the extended position to the retracted position.

10. A foldable work platform configured to couple to a modular storage unit, the foldable work platform comprising:
- a first housing comprising a first work surface;
- a second housing comprising a second work surface, the second housing pivotally coupled to the first housing such that the first housing and the second housing are configured to actuate between an open configuration and a closed configuration, wherein the first work surface and the second work surface are coplanar when the first housing and the second housing are positioned in the open configuration;
- a first support structure pivotally coupled to the first housing;
- a second support structure pivotally coupled to the second housing, the first support structure and the second support structure configured to collectively support the first housing and the second housing when the first housing and the second housing are positioned in the open configuration;
- a first plurality of male couplers coupled to the first support structure, the first plurality of male couplers configured to couple the foldable work platform to a first surface of a stackable storage unit; and
- a second plurality of male couplers coupled to the second support structure, the second plurality of male couplers configured to couple the foldable work platform to the first surface of the stackable storage unit.

11. The foldable work platform of claim 10, each of the male couplers of the first plurality of male couplers comprising a first tongue and an opposing second tongue each extending in a first direction, and each of the male couplers of the second plurality of male couplers comprising a first tongue and an opposing second tongue each extending in a second direction.

12. The foldable work platform of claim 11, the first support structure configured to actuate between an extended position in which the first support structure extends from the first housing and a retracted position in which the first support structure is at least partially retracted within the first housing, the second support structure configured to actuate between an extended position in which the second support structure extends from the second housing and a retracted position in which the second support structure is at least partially retracted within the second housing.

13. The foldable work platform of claim 12, wherein the first direction and second direction are opposite each other when the first support structure and the second support structure are each in the retracted position and the first housing and the second housing are in the open configuration.

14. The foldable work platform of claim 12, wherein the first direction and second direction extend in the same direction parallel to each other when the first support structure and the second support structure are each in the retracted position and the first housing and the second housing are in the closed configuration.

15. The foldable work platform of claim 10, wherein the first work surface defines a first planar work surface, and wherein the second work surface defines a second planar work surface.

16. The foldable work platform of claim 10, comprising a latch configured to couple the first housing to the second housing when the first housing and the second housing are in the closed configuration.

17. A foldable work platform configured to couple to a modular storage unit, the foldable work platform comprising:
- a first housing comprising a first work surface;
- a second housing comprising a second work surface, the second housing pivotally coupled to the first housing such that the first housing and the second housing are configured to actuate between an open configuration and a closed configuration, wherein the first work surface and the second work surface are coplanar when the first housing and the second housing are positioned in the open configuration;
- a first support structure pivotally coupled to the first housing;
- a second support structure pivotally coupled to the second housing, the first support structure and the second support structure configured to collectively support the first housing and the second housing when the first housing and the second housing are positioned in the open configuration;
- a first plurality of coupling components coupled to the first support structure, the first plurality of coupling components configured to couple the foldable work platform to a stackable storage unit; and
- a second plurality of coupling components coupled to the second support structure, the second plurality of coupling components configured to couple the foldable work platform to the stackable storage unit, wherein the first plurality of coupling components and the second plurality of coupling components face away from each other when the first housing and the second housing are in the closed configuration.

18. The foldable work platform of claim 17, the first plurality of coupling components comprising a first front row of at least two coupling components and a first rear row of at least two coupling components parallel to the first front row, and the second plurality of coupling components comprising a second front row of at least two coupling components and a second rear row of at least two coupling components parallel to the second front row.

19. The foldable work platform of claim 17, comprising a latch configured to engage with the stackable storage unit and thereby prevent sliding disengagement of the foldable work platform from the stackable storage unit when the first plurality of coupling components are engaged with a third plurality of coupling components of the stackable storage unit.

* * * * *